(12) United States Patent
Komatsu et al.

(10) Patent No.: US 6,265,341 B1
(45) Date of Patent: Jul. 24, 2001

(54) HIGHLY FUNCTIONAL BASE MATERIAL AND A METHOD OF MANUFACTURING THE SAME

(75) Inventors: Teruo Komatsu, 1-24, Karita 2-chome, Sumiyoshi-ku, Osaka-shi, Osaka 558; Akio Harada; Ryosuke Ueyama, both of Osaka, all of (JP)

(73) Assignees: Teruo Komatsu; Daiken Chemical Co., Ltd., both of Osaka (JP)

( * ) Notice: Subject to any disclaimer, the term of this patent is extended or adjusted under 35 U.S.C. 154(b) by 0 days.

(21) Appl. No.: 09/477,061

(22) Filed: Jan. 3, 2000

Related U.S. Application Data

(62) Division of application No. 09/068,831, filed as application No. PCT/JP97/02958 on Aug. 22, 1997, now Pat. No. 6,121,191.

(30) Foreign Application Priority Data

Sep. 20, 1996 (JP) .................................................. 8-249968
Jul. 15, 1997 (JP) .................................................. 9-222912
Aug. 6, 1997 (JP) .................................................. 9-245885

(51) Int. Cl.$^7$ ...................................................... B01J 23/40
(52) U.S. Cl. .................. 502/326; 502/330; 502/339; 502/344; 502/347; 502/350; 501/95; 252/514
(58) Field of Search .................................. 502/326, 330, 502/347, 350, 339, 344; 501/95; 423/598; 252/514

(56) References Cited

U.S. PATENT DOCUMENTS

| | | | |
|---|---|---|---|
| 4,536,482 | * 8/1985 | Carcia | 502/5 |
| 5,362,908 | * 11/1994 | Schroeder et al. | 562/487 |
| 5,593,737 | * 1/1997 | Meinzer et al. | 427/512 |
| 5,616,792 | * 4/1997 | Bartos et al. | 562/486 |
| 5,686,372 | * 11/1997 | Langford et al. | 502/242 |
| 5,756,833 | * 5/1998 | Rosen et al. | 562/486 |
| 5,789,337 | * 8/1998 | Haruta et al. | 502/344 |
| 5,854,169 | * 12/1998 | Heller et al. | 502/242 |
| 5,875,384 | * 2/1999 | Peill et al. | 422/186.3 |
| 5,919,422 | * 7/1999 | Yamanaka et al. | 422/121 |
| 6,027,797 | * 2/2000 | Watanabe et al. | 428/312.8 |
| 6,037,289 | * 3/2000 | Chopin et al. | 502/2 |

FOREIGN PATENT DOCUMENTS 2-251290 * 10/1990 (JP) .
6-170220 * 6/1994 (JP) .

* cited by examiner

*Primary Examiner*—Steven P. Griffin
*Assistant Examiner*—Cam N. Nguyen
(74) *Attorney, Agent, or Firm*—Koda & Androlia

(57) ABSTRACT

A highly functional base material and a method of manufacturing the same. The highly functional base material is made from a photocatalyst comprising fine particles of rutile type titanium dioxide supporting ultra-fine metal particles selected from the group consisting of Pt, Au, Pd, Rh, Ag and Ru with a particle diameter which manifest a quantum size effect is held on a base material. The method includes applying a layer of fine particles or rutile type titanium dioxide which support ultra-fine metal particles thereon to the surface of the base material.

3 Claims, 16 Drawing Sheets

Spectroscopic distribution (Moth-attracting lamp)

Maximum value of energy shown as 100%
Wavelength (nm)

Wavelength distribution of sunlight

Lattice image of Pt/TiO$_2$(300nm)

HIGHLY FUNCTIONAL BASE MATERIAL AND A METHOD OF MANUFACTURING THE SAME

This is a Divisional Application of application Ser. No. 09/068,831, filed May 18, 1998, which is a 371 of PCT/JP97/02958 filed Aug. 22, 1997, now U.S. Pat. No. 6,121,191 issued Sep. 19, 2000.

TECHNICAL FIELD

The present invention relates to a photocatalyst which can clean the environment by decomposing environmental contaminants, etc., and more particularly to a technical field of a photocatalyst which causes a conspicuous improvement in photocatalytic efficiency in quantum-mechanical terms by supporting nano-scale ultra-fine metal particles, which are capable of realizing a quantum size effect, on fine particles of a photocatalyst, and a highly functional base material which can clean the environment with high efficiency by holding the photocatalyst supporting ultra-fine metal particles on the surface of such a material.

BACKGROUND ART

A photocatalytic reaction of titanium dioxide was reported in *Nature* in 1972 and became known world-wide as the Honda-Fujishima effect. Since then, research has been conducted on the production of hydrogen and carbon dioxide by the decomposition of water or the decomposition of aqueous solutions of organic matter by means of titanium dioxide under irradiation with light; and today, a technique in which fine particles of titanium dioxide are held in the form of a thin film on tiles or window glass is in the process of being adapted for practical use in the decomposition of environmental contaminants, i.e., tobacco tar and organic matter such as bacteria, toxins produced by bacteria, etc.

Titanium dioxide is a powder-form metal oxide and is used after being dispersed in a solution in the case of decomposition of water or solutions. However, it is desirable that titanium dioxide adhere to window glass and bathroom tiles, or to the surfaces of construction materials, in the form of a uniform thin film even when titanium dioxide is used in particle form. Accordingly, methods such as sol-gel methods, spray pyrolysis methods using titanium acetate, etc., and dip coating methods, etc. have been developed. These techniques are described in "*Oyo Butsuri* (Applied Physics)", Vol. 64, No. 8, p. 803 (1995), "*Kayak to Kogyo* (Chemistry and Industry)", Vol. 48, No. 10, p. 1256 (1995), and "*Kayak to Kogyo* (Chemistry and Industry)", Vol. 49, No. 6, p. 764 (1996). It has been shown that adhering oils and tobacco tar can be decomposed while being irradiated with ultraviolet light using a glass, etc. covered with such titanium dioxide. It is difficult to decompose inorganic matter such as dirt and dust, etc.; however, it has been reported that since such inorganic matter adheres with organic substances such as oils, etc. as a binder, the decomposition of organic matter also tends to prevent the adhesion of inorganic matter.

The principle of the action of fine particles of titanium dioxide on materials such as tiles, etc. is based on the photocatalytic characteristics of titanium dioxide as a semiconductor. If titanium dioxide is irradiated with light which exceeds the band gap energy, e.g., ultraviolet light, then the electrons in the valence electron band are excited and undergo a transition to the conduction band, so that positively charged holes are left in the valence electron band, thus producing electron-hole pairs. These electrons and holes move through the titanium dioxide and reach the surface; and the electrons are supplied to oxygen in the air so that $O_2^-$ (super-oxide anion) is produced and other substances are reduced. The holes not only cause direct oxidative decomposition of organic matter but also oxidize water molecules adhering to the surface so that strongly oxidizing hydroxyl radicals are formed, and other substances are oxidized by the oxidizing power of these hydroxyl radicals. The $O_2^-$ reportedly participates in this oxidation process; however, the detailed reaction circuit is still being studied. Thus, organic matter is decomposed into carbon dioxide and water by electron-hole pairs excited by light.

In this research, instances have been found in which the electrons and holes re-couple and disappear prior to the oxidation-reduction of external substances in cases where titanium oxide is used alone. Accordingly, it has been indicated that there are limits to the photocatalytic efficiency of titanium dioxide. The ordinary state of titanium dioxide is a powdered state; considering a single particle of titanium dioxide, there are countless lattice defects such as point defects and plane defects, etc. in the surface and interior portions of the particle. When electrons and holes excited in titanium dioxide by ultraviolet light encounter lattice defects in the process of movement, these electrons and holes are captured by the lattice defects and caused to re-couple. In some cases, furthermore, even if the electrons and holes are able to move to the surface, the electrons and holes re-couple when they approach each other. In order to ameliorate such problems, it is necessary to develop techniques for manufacturing titanium dioxide which is free of lattice defects, and techniques for separating electrons and holes at the surface. In regard to the former techniques, improvements have been made in crystal growth techniques; however, since these techniques have no direct connection with the present invention, a detailed description will be omitted here.

In regard to techniques for separating electrons and holes at the surface, a photocatalyst has been proposed in which an electrode which collects excited electrons is formed on the surface of titanium dioxide, so that holes are separated and collected on the surface of the titanium dioxide, while electrons are separated and collected on the surface of the metal electrode. If this approach is used, electrons can be efficiently collected on the surface of the metal electrode, and holes and electrons can be separated; accordingly, the probability of re-coupling would appear to be lowered. Photocatalysts of this type are referred to as "metal-supporting photocatalysts", and are manufactured by forming metals conventionally used as catalysts, such as Pt (platinum) and Cu (copper), etc. on the surface of titanium dioxide. The idea here is that if the metals have a catalytic effect even when used alone, then a synergistic effect with the catalytic action of titanium dioxide should be exhibited.

Methods that have been developed for manufacturing such metal-supporting photocatalysts include: photo-deposition methods in which the semiconductor is suspended in an aqueous solution of a metal salt, after which a reducing agent is added and irradiation with light is performed; impregnation methods in which the semiconductor is immersed in an aqueous solution of a metal salt and dried, after which a reduction treatment is performed; chemical deposition methods in which the semiconductor is violently agitated in an aqueous solution of a metal salt and a reducing agent is added; and simultaneous precipitation methods in which an aqueous solution of a metal salt is added to the semiconductor raw material and simultaneous precipitation is performed, after which sintering is performed. Furthermore, other methods which have been developed include: kneading methods in which the semiconductor and a powdered metal are mixed in a mortar; shaking mixing methods in which the semiconductor and a powered metal are placed in a vessel and mixed by shaking using a shaker, etc.; and powdered metal addition methods in which the semiconductor and a powdered metal are separately added to reaction product solutions and are then suspended and mixed.

The present inventors successively investigated these methods but were unable to form micron-sized fine metal particles that have a particle diameter of 0.1 microns or greater on the surface of titanium dioxide. In other words, the inventors reached the conclusion that the formation of nano-scale ultra-fine metal particles capable of exhibiting a quantum size effect on the surface of a semiconductor is difficult as long as powdered metals or aqueous solutions of metal salts are used. Furthermore, in such conventional methods, the number of fine metal particles that can be supported on one titanium dioxide particle (i.e., the supported particle density) is limited to the range of a few tens of particles. The reasons for such a small supported particle density are that there are problems in the manufacturing methods used, and at the same time, since the particle diameter of the fine metal particle is large, not many fine metal particles adhere to the surface of one titanium dioxide particle. Thus, according to measurements performed by the present inventors, the photocatalytic efficiency of metal-supporting photocatalysts produced by conventional manufacturing methods shows only about a two- to four-fold reinforcement compared to the photocatalytic efficiency of titanium dioxide used alone.

The present inventors made a theoretical investigation, with reference to FIG. 18, concerning the problem of why the photocatalytic efficiency is not greatly reinforced by micron-sized fine metal particles.

In order to achieve efficient incorporation of the electrons generated in titanium dioxide into a metal electrode, it is desirable that the electron transition barrier at the interface between the titanium dioxide and the metal be as small as possible. However, in cases where the particle diameter of the fine metal particles is micron-sized (approximately 0.1 microns or greater), the electron state has roughly the same band structure as a large solid crystal (bulk crystal). In other words, a structure is obtained in which the valence electron band and the conduction band are distinctly formed, with the bands being separated by a fixed band gap, and with free electrons being densely packed in order from the bottom to the uppermost Fermi level in the conduction band. Meanwhile, since titanium oxide is a bulk crystal, the electron state naturally adopts a band structure. In such a band structure, the energy levels constituting the bands are densely arranged more or less continuously, and wave functions corresponding to the respective levels are sharply localized within the substance. In other words, since the wave functions do not extend beyond the substance, the probability that the electrons residing at these levels will be released to the outside of the substance is fairly small.

When, in this state, titanium dioxide is irradiated with ultraviolet light so that electrons are excited into the conduction band so as to cause electron-hole pairs to be formed, in order for these electrons to reduce an external substance A and produce super-oxide anions, it is necessary that the electrons quickly move from the titanium dioxide into the metal, and that the electrons further move from the metal into external substance A outside the metal. However, as described above, since the fine metal particles are micron-sized particles, not only does the electron state adopt a band structure similar to that of a large crystal, but the wave functions also have a structure which is sharply localized within the fine metal particles. Accordingly, since it is not easy for the electrons which have claimed to the conduction band of the titanium dioxide to enter the wave functions of the metal, it is likewise not easy for the electrons to move to the conduction band of the metal. Furthermore, even if the electrons somehow manage to move into the metal, it is similarly difficult for the electrons to move from the metal into an external substance; and in most cases, therefore, before the electrons can leave the metal, the electrons quickly drop to the Fermi level $E_F$ which is in the conduction band of the metal, so that the chance of reacting with the external substance is further diminished.

More specifically, in cases where the level density of the conduction band is high as in the band structure of a bulk crystal, the time required for electrons to drop to the Fermi level (i.e., the relaxation time) is extremely short; and this, together with the localization of the wave functions, prevents the movement of electrons to the outside. In other words, in the case of micron-sized particles, since it is difficult for electrons to move to the outside, electrons are accumulated to an excessive degree inside the metal, so that the movement of electrons from the titanium dioxide into the metal is conversely prevented by the repelling electric field. In the final analysis, it may be concluded that in cases where the particle diameter of the fine metal particles is in the micron size region, electrons remain inside the titanium dioxide or fine metal particles as a result of the energy band structure and localization of the wave functions, so that the probability of electrons to be released to the outside of the metal is reduced to a small value. At the same time, in the case of micron-sized fine metal particles, the number of fine metal particles that can be supported on one titanium dioxide particle is limited to several tens of particles; these are the reasons why the photocatalytic efficiency of such metal-supporting photocatalysts is limited.

Photocatalysts have a decomposing effect on environmental contaminants; and an idea of endowing such photocatalysts with an adsorbing effect has also appeared. Substances that provide such an adsorbing effect include porous materials such as active carbon, active carbon fibers and zeolite, etc. The active carbon fiber is shown in FIG. 19, and in the surface of this fiber, countless pores with a diameter of approximately 0.5 nm, i.e., so-called "micropores", are opened. Environmental contaminants such as organic substances, etc. are adsorbed in these micropores. Since the active carbon fibers can be worked into a variety of shapes, they are widely used in water cleaners and air cleaners.

If such active carbon fibers are used as a base material and caused to hold a photocatalyst, then it should be possible for the active carbon fibers to adsorb environmental contaminants so that the photocatalyst can decompose these environmental contaminants. A deodorizing device in which a photocatalyst is held on active carbon is described in Japanese Patent No. 2574840. FIG. 20 is a conceptual diagram of a photocatalyst in which anatase type titanium dioxide is held on active carbon fibers. If all of the organic matter adsorbed in the micropores were to be decomposed by the photocatalyst, then a adsorbing/decomposing power with an efficiency of 100% would be obtained. However, as described above, since there are limits to the decomposing power of titanium dioxide used alone, some organic matter remains in the micropores. Consequently, the adsorbing power of the active carbon fibers gradually drops until at some point only the decomposing power of the anatase type titanium dioxide remains. Thus, it has been found that the initially expected effect cannot be obtained. The main reason for this is the above-described limit on the photocatalytic efficiency of anatase type titanium dioxide, while a breakthrough improvement in photocatalytic efficiency is hoped for.

Titanium dioxide includes anatase type titanium dioxide and rutile type titanium dioxide according to differences in crystal structure. Of these two types, rutile type titanium dioxide has a more stable structure. When heated to approximately 600° C. or higher, all anatase type titanium dioxide undergoes a phase transition to a rutile type, and this rutile type remains at low temperatures following cooling. Even at temperatures below 600° C., a portion of such anatase type titanium dioxide is converted into rutile type titanium dioxide. Accordingly, rutile type titanium dioxide can be mass-produced more inexpensively than anatase type titanium dioxide. Conventionally, however, all of the titanium dioxide used as a photocatalyst has been anatase type titanium dioxide, and inexpensive rutile type titanium dioxide has not been used at all. The reason for this may be understood from the band structure.

The band structure of rutile type titanium dioxide is shown in FIG. 21. The gap energy thereof is 3.05 eV. Electrons excited to the conduction band by ultraviolet light reach the bottom of the conduction band while expending a portion of their energy due to relaxation. Since the oxygen potential which is the reduction potential is positioned at 3.13 eV, the climbing of electrons from the bottom of the conduction band to the oxygen potential requires external energy and tends not to happen spontaneously. Accordingly, in the case of rutile type titanium dioxide, it is difficult to form super-oxide anions.

Meanwhile, FIG. 22 shows the band structure of anatase type titanium dioxide. Here, the gap energy thereof is 3.20 eV, so that even if the excited electrons drop to the bottom of the conduction band following excitation by ultraviolet light, oxygen at 3.13 eV can be sufficiently reduced. Thus, anatase type titanium dioxide has the capacity to produce super-oxide anions. Accordingly, in conventional techniques, it has been necessary to use expensive anatase type titanium dioxide as a photocatalyst.

Accordingly, the first object of the present invention is to find a method that makes it possible to achieve a great improvement in the photocatalytic efficiency of titanium dioxide. The second object of the present invention is to find a method which makes it possible for rutile type titanium dioxide, which as not been utilizable as a photocatalyst in the past despite its low cost, to be utilized as a photocatalyst. The third object of the present invention is to provide an effective means of cleaning the environment by causing fine particles of a reinforcing photocatalyst to be held on various types of base materials. The fourth object of the present invention is to realize a photocatalyst which causes an effective continuation of the adsorbing power of active carbon fibers, etc., thus achieving an extended useful life of the adsorption/decomposition cycle and especially to realize a practically effective means of cleaning the environment.

DISCLOSURE OF THE INVENTION

The photocatalyst supporting ultra-fine metal particles that is provided by the present invention is constructed by supporting ultra-fine metal particles with a particle diameter that makes it possible to manifest a quantum size effect on fine particles of a photocatalyst. As a result of the quantum size effect of the ultra-fine metal particles, photo-excited electrons are forcibly expelled from the metal, so that super-oxide anions can be produced with a high efficiency, thus allowing high-speed decomposition of environmental contaminants.

By setting the mean particle diameter of the ultra-fine metal particles in the range of 1 to 10 nm, the quantum size effect can be maximally heightened.

by setting the supported particle density of the metal, i.e., the mean number of ultra-fine metal particles supported on one fine photocatalyst particle, at 100 ultra-fine particles or greater, the efficiency of environmental contaminant decomposition can be increased, and a light source consisting of natural sunlight can also be used.

By constituting the ultra-fine metal particles with a transition metal, and by constituting photocatalytic substance with a metal oxide semiconductor which has the capacity to produce hydroxyl radicals and/or super-oxide anions when irradiated with ultraviolet light, a photocatalyst supporting ultra-fine metal particles which has a high reactivity can be realized.

By selecting the ultra-fine metal particles from Pt, Au, Pd, Rh or Ag, and the fine photocatalyst particles are made of titanium dioxide, then a photocatalyst supporting ultra-fine metal particles which has a high degree of stability and safety can be realized.

Even if rutile type titanium dioxide is used, a photocatalytic efficiency which is comparable to that of anatase type titanium dioxide can be obtained, and the photocatalyst supporting ultra-fine metal particles can be mass-produced at low cost.

By holding such a photocatalyst supporting ultra-fine metal particles on a base material, it is possible to obtain a highly functional base material in which a high photo-degrading power is added to the intrinsic functions of the base material.

Since molding that uses fibers as a base material can be executed extremely easily, fibers are widely used in a variety of devices such as deodorizers, water cleaners and air conditioners, etc.

If the fibers used are fibers of an adsorbing material, then environmental contaminants can be adsorbed on these fibers of an adsorbing material and decomposed by the photocatalyst supporting ultra-fine metal particles. Accordingly, a long-term adsorbing/decomposing function can be obtained merely by installing the photocatalyst.

By setting the weight of the photocatalyst supporting ultra-fine metal particles to be 1% or more of the weight of the above-described fibers of an adsorbing material, an adsorption-decomposition equilibrium can be realized.

By molding such highly functional fibers, it is possible to obtain various types of highly functional fiber products such as fabrics, curtains and carpets, etc. which have a high photo-degrading power.

By mixing an organo-metallic compound that can be reduced by heating and fine photocatalyst particles in a solvent so that the organo-metallic compound is caused to adhere to the surfaces of the fine photocatalyst particles, and then removing the solvent from this mixed solution and firing the residue, it is possible to support numerous nano-scale ultra-fine metal particles on the surfaces of the fine photocatalyst particles.

By spraying fine photocatalyst particles and a solution of an organo-metallic compound that can be reduced by heating toward each other so that numerous particles of the organo-metallic compound are caused to adhere to the surfaces of the fine photocatalyst particles, and by firing the fine photocatalyst particles while they are falling downward, a photocatalyst supporting ultra-fine metal particles can be continuously manufactured.

With a use of a hydrophobic colloid of an organo-metallic complex as the above-described organo-metallic compound, a photocatalyst supporting nano-scale ultra-fine metal particles can be reliably manufactured.

By allowing the photocatalyst supporting ultra-fine metal particles to be electrostatically adsorbed on the surface of the base material, a highly functional base material can easily be obtained.

A highly functional base material with a long useful life which holds a photocatalyst supporting ultra-fine metal particles can be obtained by means of a continuous process that comprises a first step in which a colloid of an organo-metallic compound is caused to adhere to fine photocatalyst particles, a second step in which the fine photocatalyst particles to which the colloid is adhering are applied to a base material, and a third step in which this base material is fired so that the organo-metallic compound is reduced, thus causing the ultra-fine metal particles to be firmly supported on the fine photocatalyst particles, and at the same time causing these fine photocatalyst particles to be firmly held on the base material.

Furthermore, a highly functional base material with a long useful life which holds a photocatalyst supporting ultra-fine metal particles can be obtained by means of a continuous process that comprises a first step in which a colloid of an organo-metallic compound is caused to adhere to fine photocatalyst particles to be firmly held on the base material.

Furthermore, a highly functional base material with a long useful life which holds a photocatalyst supporting ultra-fine metal particles can be obtained by means of a continuous process that comprises a first step in which a colloid of an organo-metallic compound is caused to adhere to fine photocatalyst particles, a second step in which the fine photocatalyst particles to which the above-described colloid is adhering are fired so that the organo-metallic compound is reduced, thus causing the ultra-fine metal particles to be firmly supported on the fine photocatalyst particles, and a third step in which these photocatalyst particles supporting ultra-fine metal particles are applied to a base material and fired so that the fine photocatalyst particles are firmly held on the base material.

By modifying a fiber raw material into active carbon fibers via a carbonization treatment and an activation treatment, and by using the resulting active carbon fibers as a base material so as to support a photocatalyst supporting ultra-fine metal particles by one of the manufacturing methods described above, a method for the continuous manufacture of highly functional active carbon fibers from fiber raw materials (the fibers themselves or fabrics, etc.) can be obtained.

By mixing fine photocatalyst particles supporting ultra-fine metal particles with a substance which has the property of spreading into a thin film on a solvent, and after forming this substance into a thin film by spread it on a solvent and then by causing the thin film to be held on the surface of a two-dimensional base material or three-dimensional base material, a highly functional base material with a planar shape or three-dimensional shape can be obtained.

The present invention will be described in detail below.

The present inventors conducted diligent research in an attempt to strengthen the photocatalytic function of titanium dioxide supporting a metal. As a result of this research, the inventors discovered that the photocatalytic function can be increased approximately 100 times or more compared to titanium dioxide used along by supporting nano-scale ultra-fine metal particles on the surface of titanium dioxide. Thus, even compared to titanium dioxide supporting micron-scale fine metal particles, an approximately 3- to 35-time increase in photocatalytic efficiency is possible. This can be achieved by converting the metal from fine particles into ultra-fine particles, i.e., by converting the particle diameter from the micron scale to the nano-scale, or in other words, by decreasing the particle size to a value that is approximately $1/10$ to $1/100$ of the micron scale (approximately 0.1 microns or greater). The mean particle diameter of the ultra-fine metal particles used in the present invention is 1 to 10 nm, preferably 1 to 5 nm. If the mean particle diameter is set at a larger value, the manifestation of the quantum size effect that will be described later is diminished, so that the strengthening of the photocatalytic efficiency is no longer conspicuous. On the other hand, if the mean particle diameter is set a smaller value, the particle size approaches atomic size; as a result, the manufacture of the ultra-fine metal particles becomes technically difficult, and at the same time becomes extremely expensive.

In cases where a fine particle-form powder of titanium dioxide, etc. is utilized as a photocatalytic substance, the number of ultra-fine metal particles that can be supported on one fine photocatalyst particle, i.e. the supported particle density of the ultra-fine metal particles, is an important element along with the particle diameter. In the present invention, the use of ultra-fine metal particles which have been greatly reduced in size to the nano-scale makes it possible to support numerous ultra-fine metal particles on a single photocatalyst particle. More specifically, as a result of realizing an extreme reduction in the particle diameter from fine metal particles on the micron scale to ultra-fine metal particles on the nano-scale, a dramatic improvement in the supported particle density is achieved. According to research performed by the present inventors, it is desirable that the mean number of ultra-fine metal particles supported on one fine photocatalyst particle be set at 100 particles or greater, and preferably at 200 particles or greater. If the supported particle density is 100 particles or greater, the photocatalytic efficiency can be conspicuously increased compared to conventional photocatalysts as a result of a synergistic effect with the quantum size effect. If this number is 200 particles or greater, a great improvement in the photocatalytic efficiency can be achieved. Of course, if the supported particle density can be increased even further, an even greater increase in the photocatalytic density can be achieved.

The quantum size effect, which is manifested only by ultra-fine metal particles, will be discussed below. For example, considering an ultra-fine particle with a diameter of 1 nm, the number of metal atoms present in such a particle is only about 10 to 100 atoms depending on the size of the atoms. Furthermore, an ultra-fine metal particle with a diameter of 10 nm would be presumed to contain approximately 10,000 to 100,000 atoms. In the case of ultra-fine metal particles which thus contain a small number of atoms, the electron energy state of the metal gradually begins to become discrete from the band structure, so that the energy levels are distributed across a broad range. For example, considering the conduction band, the numerous energy levels constituting the conduction band are distributed from a tightly packed state upward and downward across a broad range while being separated from each other. This discrete separation of the energy levels has the effect of lengthening the relaxation time of the electrons, i.e. the time required for the electrons to drop from these levels to the Fermi level. In other words, the time that electrons are resident at a given level is extended. At the same time, this has the effect of causing the wave functions corresponding to the energy levels to protrude to the outside of the metal while extending shoulders to the left and right, and simultaneously causing the peaks of the wave functions to be lowered. In other words, the electrons carried on these wave functions can easily move to the outside as a result of the quantum tunneling effect. The term "quantum tunneling effect" used in the present invention refers to the manifestation of a quantum tunneling effect caused by the discrete separation of the energy levels and the non-localization of the wave functions as described above.

FIG. 1 shows a state in which a photocatalyst supporting ultra-fine metal particles is held on active carbon fibers. It is desirable that the weight of the photocatalyst supporting ultra-fine metal particles be equal to 1% or more, and preferably 3% or more, of the weight of the fibers. If this weight ratio is less than 1%, the effect of the photocatalyst supporting ultra-fine metal particles becomes insufficient. The photocatalyst consists of rutile type titanium dioxide, and ultra-fine metal particles with a particle diameter of several nm are supported on this rutile type titanium dioxide at a high density. First, the active carbon fibers adsorb organic matter consisting of environmental contaminants, and this organic matter is packed into the micropores of the active carbon fibers. Next, the photocatalyst supporting ultra-fine metal particles begins to break down the organic matter.

So as to examine how titanium dioxide supporting ultra-fine metal particles performs an efficient oxidation-reduction reaction with respect to organic matter, FIG. 2 shows the energy state in a case where ultra-fine metal particles are supported on titanium dioxide. When the titanium dioxide is irradiated with ultraviolet light, electron-hole pairs are formed, and the electrons are excited to the conduction band, leaving the holes in the valence electron band. In the case of excitation by ultraviolet light with a large energy, the electrons make a transition to a high potential in the conduction band; however, the electrons drop to the bottom of the conduction band while gradually losing energy. Since the energy levels of the metal are separated at a certain density, an energy level that corresponds to the bottom of the conduction band of the titanium dioxide always exists. Furthermore, the wave function of this level extends long shoulders to the left and right, so that the left end of the wave function extends into the titanium dioxide, and the right end of the wave function extends to the outside of the metal. In other words, the energy levels of the titanium dioxide and the metal are continuous (in resonant terms) via the wave functions of the metal. Excited electrons in the conduction band of the titanium dioxide are carried on the wave functions of the metal and are promptly expelled to the outside via the metal as a result of the quantum tunneling effect. Since the titanium dioxide and the metal are in a resonant state, this quantum tunneling effect is referred to as "resonance tunneling". In this case, since the levels in the metal are discretely separated, the relaxation time is lengthened, so that the electrons can easily be released to the outside of the metal before dropping to the Fermi level of the metal.

The holes present in the valence electron band of the titanium dioxide move to the surface of the titanium dioxide and oxidize the external substance D. Furthermore, not only are external substances oxidized, but also water adhering to the surface is thought to be oxidized so that strongly oxidizing hydroxyl radicals are produced, and it is thought that these hydroxyl radicals also cause the oxidative decomposition of external substances. Meanwhile, the electrons released to the outside of the metal by resonance tunneling not only cause direct reduction of the external substance A but also reduce oxygen in the air, thus producing super-oxide anions $O_2^-$, and it is thought that these anions also participate in the decomposition of the external substance D.

In particular, the excited electrons which move from the titanium dioxide into the metal in the present invention do not accumulate in the metal, but are instead immediately released to the outside, so that no repelling electric field is formed on the outside. Accordingly, a superior reducing power is obtained in that the excited electrons produced by irradiation with ultraviolet light can be successively attracted.

The type of photocatalyst used in the present invention is not limited to titanium dioxide but is rather determined by the substance that is to be decomposed, i.e. the substance that is to be subjected to oxidation-reduction. In cases where the substance that is to be decomposed is a substance that is reduced, a reduction potential exists; and in the case of a substance that is oxidized, an oxidation potential exists. It is necessary that the above-described reduction potential and oxidation potential be positioned within the energy gap between the valence electron band and the conduction band of the photocatalytic substance. To describe this in greater detail, it is desirable to select a photocatalytic substance which is such that the reduction potential is positioned on the upper side within the gap, and the oxidation potential is positioned on the lower side within the gap, as shown in FIG. 2. In this case, excited electrons can drop from the bottom of the conduction band to the reduction potential and reduce the target substance, and holes can climb from the upper end of the valence electron band to the oxidation potential and oxidize the target substance. However, since resonance tunneling of the ultra-fine metal particles also has an effect in the present invention, the reduction potential may also be positioned at the bottom of the conduction band or slightly higher.

Since rutile type titanium dioxide is used in FIG. 2, the reduction potential is positioned 0.08 eV above the bottom of the conduction band as in FIG. 20. In this case, the excited electrons are carried on the wave function of the metal at this position by resonance tunneling before the electrons drop to the bottom of the conduction band, so that external substances are quickly reduced as a result of resonance tunneling from the metal level. The fact that rutile type titanium dioxide can be utilized as a photocatalyst in the same manner as anatase type titanium dioxide as a result of this resonance tunneling is of very great significance. As a result of the present invention, inexpensive rutile type titanium dioxide which can be mass-produced has attracted attention as a photocatalyst for the first time. As a result of the present invention, photocatalysts may quickly become popular in a wide range of applications.

Furthermore, in research performed in recent years, it has been considered that the electrons reduce $O_2$ to produce super-oxide anions $O_2^-$, the holes oxidize water to produce hydroxyl radicals, and these $O_2^-$ anions and hydroxyl radicals decompose the target substances. Accordingly, photocatalytic substances can also be selected with the $O_2$ potential selected as the reduction potential, and the OH potential selected as the oxidation potential. In other words, a photocatalytic substance which may be used is such that electron-hole pairs are produced by irradiation with ultraviolet light, oxygen in the air or in water is reduced by the electrons so that super-oxide anions are produced, and water adhering to the surface is oxidized by the holes so that hydroxyl radicals are produced.

A semiconductor is appropriate as the photocatalytic substance used. In the case of insulators, the gap energy is excessively large so that the production of electron-hole pairs by means of ordinary ultraviolet light is difficult. On the other hand, in the case of substances which have a small gap energy, it is difficult to position the oxidation and reduction potentials within the forbidden band, and such substances tend to dissolve in aqueous solution; accordingly, substances of this type are unsuitable.

Among semiconductors, metal oxide semiconductors are especially appropriate for use in the present invention. Compared to simple metals, metal oxides are extremely stable substances; thus, such substances have a low reactivity with other substances and are therefore safe. Moreover, metal oxides are sufficiently capable of electron transfer. Accordingly, metal oxide semiconductors which have such properties can be utilized a the photocatalytic substance of the present invention. For example, such metal oxides can be selected in accordance with the substance that is the object of decomposition from presently known substances including $WO_3$, $CdO_3$, $In_2O_3$, $Ag_2O$, $MnO_2$, $Cu_2O_3$, $Fe_2O_3$, $V_2O_5$, $TiO_2$, $ZrO_2$, $RuO_2$, $Cr_2O_3$, $CoO_3$, $NiO$, $SnO_2$, $CeO_2$, $Nb_2O_3$, $KTaO_3$, $SrTiO_3$ and $K_4NbO_{17}$, etc. Among these metal oxides, $TiO_2$, $SrTiO_3$ and $K_4NbO_{17}$ are especially desirable from the standpoints of the density of electron-hole pairs produced, the density of super-oxide anions and hydroxyl radicals produced and material properties such as corrosion resistance and safety, etc.; and $TiO_2$, i.e., titanium dioxide, is the most desirable.

Photocatalytic substances which can be used in the present invention consist of fine particles. Since fine particles have an extremely large surface area, the probability of contact with environmental contaminants is large; at the same time, numerous ultra-fine metal particles can be supported on the surfaces of such fine particles. Furthermore, fine particles have a larger effective light-receiving surface for ultraviolet light, etc., so that the photocatalytic efficiency is greatly improved compared to that of bulk substances. Since metal oxides ordinarily consist of powders, a metal oxide semiconductor such as titanium dioxide is suitable for use in the present invention. The particle diameter used is 30 nm to 1,000 nm, preferably 50 nm to 500 nm. If the particle diameter is smaller than this, the particles approach the size of ultra-fine particles; as a result, special techniques are required for manufacture, and in addition, the cost increases. On the other hand, if the particle diameter is greater than this, the specific surface area is decreased so that the reactivity with environmental contaminants, substances which are toxic to the human body and substances with unpleasant odors, etc. deteriorates.

For example, titanium dioxide can be formed into ultra-fine particles with a diameter of approximately 10 nm; however, such particles do not remain in the state of independent particles, but instead form aggregations of ultra-fine titanium dioxide particles so that large titanium dioxide clumps of the type described above are formed after all. In this case, since the particles are stuck together in an uneven configuration, the surface area is larger than in the case of single large particle, so that the reactivity is increased. The present invention includes such fine photocatalyst particles also. There are no particular restrictions on the shape of the fine photocatalyst particles as long as these particles are capable of supporting ultra-fine metal particles; for example, shapes of spherical, pellet-form or granule-form particles, etc. may be employed.

The light source used in the present invention may be any light source which has an energy greater than the band gap energy of the photocatalyst. Ordinarily, an ultraviolet lamp is used. Especially in cases where titanium dioxide is used, both rutile type and anatase type titanium dioxide are converted into wavelengths, the value for rutile type titanium dioxide is 407 nm, and the value for anatase type titanium dioxide is 388 nm. Accordingly, it is desirable that the wavelength distribution of the light source used for titanium dioxide have a peak in the vicinity of 400 nm. A moth-attracting lamp with the wavelength distribution shown in FIG. 3 has a peak in the vicinity of 400 nm; accordingly, such a lamp can be used for both rutile type and anatase type titanium dioxide and is therefore extremely desirable.

Natural sunlight with the wavelength distribution shown in FIG. 4 is mostly a visible light but includes 400 nm; therefore, such light is adequate for use. In the case of natural sunlight, the light intensity is higher at 407 nm than at 388 nm; accordingly; rutile type titanium dioxide is more effective than anatase type titanium dioxide in this case. Thus, the fact that rutile type titanium dioxide can be utilized as a photocatalyst in the present invention opens an important path allowing the use of natural sunlight. This contrasts with the case of conventional anatase type titanium dioxide, which, while allowing the use of ultraviolet lamps, shows an extremely low catalytic efficiency in the case of natural sunlight. Furthermore, in the case of conventional photocatalysts, the use of outdoor sunlight is possible, since the light intensity is strong; however, in the case of indoor use, the light intensity is weak, so that such use is a weak point of conventional photocatalysts. In the present invention, on the other hand, since the photocatalytic efficiency is greatly improved, the indoor utilization of photocatalysts using natural sunlight as a light source can be expanded.

It is desirable that the ultra-fine metal particles that are supported be particles of a transition metal. Transition metal elements are elements which have incompleted shells, and these elements are metallic elements comprising four groups with atomic numbers ranging respectively from 21 (Sc) to 29 (Cu), 39 (Y) to 47 (Ag), 57 (La) to 79 (Au), and 89 (Ac) to a theoretical 111. Since the d shells of these elements are incomplete, the outermost shells possess directionality according to the d electrons; as a result, excited electrons coming from the photocatalytic substance can easily be captured at the surfaces of the ultra-fine metal particles, so that super-oxide anions are easily produced.

Metals which can be used alone as catalysts are desirable, and Au, Pt, Ag, Pd and Rh are especially desirable from the standpoint of safety, since such elements have been historically demonstrated to be safe even in the case of long-term used. From the standpoint of stability as metals, Au, Pt and Pd are more preferable.

The feature of the present invention is that the present invention has established a method for supporting and forming ultra-fine metal particles on the surfaces of a photocatalytic substance consisting of fine particles. In conventional manufacturing methods, it is possible to support micron-sized fine metal particles; however, such methods are incapable of forming and supporting nano-scale ultra-fine metal particles. The limitations of such conventional manufacturing methods also hinders the improvement of the photocatalytic efficiency.

Conventional manufacturing methods have used metal salts or powdered metals as raw materials. In the present invention, on the other hand, organo-metallic compounds which can be reduced by heating are used. As a result, a great improvement in photocatalytic efficiency is achieved. The term "reducible by heating" means that the metal alone can be isolated from the organo-metallic compound when this compound is heated, i.e., that the other organic components can be separated out. Among such organo-metallic compounds, organo-metallic complexes are especially suited to the purpose of the present invention. However, it goes without saying that there are no particular restrictions on the compounds used, as long as these compounds are organo-metallic compounds which can be reduced by heating.

Examples of such compounds include Li compounds such as ethyllithium and p-dimethylaminophenyllithium, etc.; Na compounds such as n-propylsodium and 2-methylfurylsodium, etc.; K compounds such as ethylpotassium and phenylpotassium, etc.; Rb compounds such as ethylrubidium and triphenylmethylrubidium, etc.; Cs compounds such as ethylcesium benzylcesium, etc.; Be compounds such as dimethyllberyllium and isopropylberyllium methoxide, etc.; Mg compounds such as methylmagnesium iodide and dimethylmagnesium, etc.; Ca compounds such as dimethylcalcium and phenylcalcium iodide, etc.; Sr compounds such as ethylstrontium iodide and dimethylstrontium, etc.; Ba compounds such as dimethylbarium and phenylbarium iodide, etc.; Zn compounds such as dimethylzinc and diethylzinc isoquinolinate, etc.; Cd compounds such as diisobutylcadmium and diphenylcadmium, etc.; Hg compounds such as methylmercury bromide, methylmercury iodide and bis (trifluoromethyl), etc.; As compounds such as dimethylarsenic and phenyldichloroarsenic, etc.; Sb compounds such as dimethylbromoantimony and trimethylantimony, etc.; Bi compounds such as dimethylbismuth and trimethylbismuth, etc.; Se compounds such as methyl selenocyanate and dimethyl selenide, etc.; Te compounds such as dimethyl telluride and β-dimethyl telluride dichloride, etc.; Po compounds such as polonium carbonyl and dimethylpolonium, etc.; B compounds such as tricyclooctylborane and 2,4-dimetylborane, etc.; Al compounds such as trimethylaluminum and dimethylaminodimethylaluminum, etc.; Ga compounds such as trimethylgallium and phenyldibromogallium, etc.; In compounds such as trimethylindium and diphenylbromoindium, etc.; Tl compounds such as dimethylbromothallium and dimethylmethoxythallium, etc.; Cu compounds such as copper tricarbonyl, phenylcopper and bis(chlorocopper)acetylene, etc.; Ag compounds such as isobutenylsilver and phenylsilver, etc.; Au compounds such as methyldibromogold, trimethylgold and diisopropylcyanogold, etc.; Pd compounds such as dichloro-(cyclooctadiene-1,5)-palladium and π-cyclopentadienyl-πcyclopentenylpalladium, etc.; Pt compounds such as πcyclopentadienyl-π-allyl-platinum, dychloro-(syclooctadiene-1,5)-palladium, etc.; Re compounds such as methyl-penta(carbonyl)-rhenium and chloro-bis (phenylacetylene)-rhenium, etc.; Rh compounds such as π-cyclopentadienyl-di(ethylene)-rhodium and octa (carbonyl)-rhodium, etc.; Ru compounds such as penta (carbonyl)-ruthenium and π-cyclopentadienyl-methyl-di (carbonyl)-ruthenium, etc.; Tc compounds such as cyclopentadienyl-tri(carbonyl)technetium, etc.; Ti compounds such as methyl-trichloro-titanium, di-π-cyclopentadienyltitanium and triisopropoxy-phenyl-titanium, etc.; V compounds such as hexa(carbonyl)-vanadium and di-π-cyclopentadienyl-dichloro-vanadium, etc.; W compounds such as hexa(carbonyl)tungsten and tri(carbonyl)-(benzene)-tungsten, etc.; Zr compounds such as cyclopentadienyltrichlorozirconium, etc.; Co compounds such as π-allyl-tri(carbonyl) cobalt and di-π-cyclopentadienylcobalt, etc.; Cr compounds such as π-cyclopentadienyl-chloro-di(nitrosyl) chromium, tri (carbonyl)-(thiophene)chromium and dibenzenechromium, etc.; Fe compounds such as dibromotetra(carbonyl)iron and tetra(carbonyl)-(acrylonitrile)iron, etc.; Ir compounds such as tri(carbonyl)piridium, etc.; Mn compounds such as bromopenta(carbonyl)manganese, etc.; Mo compounds such as tri(carbonyl)-(benzene)-molybdenum, etc.; Ni compounds such as tetratri(carbonyl)nickel and diacrylonitrilenickel, etc.; Os compounds such as (benzene)-(cyclohexadiene-1,3)osmium, etc.; Si compounds such as methyltrichlorosilane and methyldifluorosilane, etc.; Ge compounds such as hexaethyldigermanium and allylgermanium trichloride, etc.; Sn compounds such as ethyltin trichloride and (2-cyano-1-methylethyl)triphenyltin, etc.; and Pb compounds such as triethyl-n-propyllead and triethyllead methoxide, etc.

From the standpoints of stability and safety as metals, as described above, it is especially desirable to use at least one Au compound, Ag compound, Pd compound, Rh compound or Pt compound. Even more desirable are compounds containing Au, Ag, Pd, Rh or Pt and a sulfur-containing organic component, and most desirable are compounds containing Au, Pd, Rh or Pt and a sulfur-containing organic component. Examples include alkylmercaptans such as methylmercaptan, ethylmercaptan, propylmercaptan, butylmercaptan, octylmercaptan, dodecylmercaptan, hexadecylmercaptan and octadecylmercaptan, etc.; thioglycolic acids such as butyl thioglycolate, etc.; and other compounds such as trimethylolpropane tris-thioglycolate, thioglycerol, thioacetic acid, thiobenzoic acid, thioglycol, thiodipropionic acid, thiourea, t-butylphenylmercaptan and t-butylbenzylmercaptan, etc. In addition, balsam gold ($C_{10}H_{18}SAuCl_{1-3}$), balsam platinum ($C_{10}H_{18}SPtCl_{1-3}$), balsam palladium ($C_{10}H_{18}SPdCl_{1-3}$) and balsam rhodium ($C_{10}H_{18}SRhCl_{1-3}$), etc., may also be used.

When one of the above-described organo-metallic compounds and a powdered photocatalytic substance each as titanium dioxide, etc., are dispersed in an appropriate universally known hydrophilic solvent, a hydrophobic colloid of the organo-metallic compound is formed; and numerous particles of this organo-metallic compound colloid adhere to the surfaces of the photocatalytic powder particles. If this mixed solution is dried, and the remaining solid residue is fired, the organic component is driven out of the organo-metallic compound, so that only the metal is supported on the surfaces of the fine photocatalyst particles in the form on nano-scale ultra-fine particles. Such a procedure includes cases where drying and firing are performed as a continuous process, e.g., cases where the solvent is evaporated by heating the mixed solution, after which the solid residue is fired by further heating, etc.

Furthermore, as a different manufacturing method, if a colloidal solution of one of the above-described organo-metallic compounds and a powdered photocatalyst are sprayed toward each other so that numerous particles of the colloid are caused to adhere to the surfaces of the photocatalyst powder particles, and the photocatalyst powder particles with these adhering colloid particles are then subjected to heat treatment while falling downward, and fine photocatalyst particles supporting ultra-fine metal particles can be continuously manufactured.

The solution concentration of the organo-metallic compound used may be appropriately set in accordance with the final product, etc., and ordinarily, this concentration is set at 0.1 wt % or greater, and preferably at 0.5 to 50 wt %. The solvent may be appropriately selected in accordance with the type of organo-metallic compound used; presently known organic solvents such as alcohols, esters and aromatic solvents, etc., may be used.

Known additives such as co-catalysts, etc., may also be contained in the above-described mixed solution in amounts which cause no loss of the effect of the present invention. Examples of co-catalysts which can be used include V, Mo, W, Nb, Cr and Ta, etc., or oxides of these metals, as well as alkali metals (Li, Na, K, Rb, Cs and Fr), alkaline earth metals (Be, Mg, Ca, Sr, Ba and Ra), and other heavy alkali metals.

The firing temperature used in the present invention is ordinarily a temperature above the reduction deposition temperature of the organo-metallic compound used, and may be appropriately varied within the temperature range below the melting point of the metal deposited by reduction. This may be described more concretely as follows: i.e., in order to isolate the metal from an organo-metallic compound such as an organo-metallic complex, it is necessary to decompose the organo-metallic compound completely, and to remove the organic atoms so that only the metal atoms remain. The temperature at which this is accomplished is defined as the reduction deposition temperature of the metal. Next, it is necessary to cause the aggregation of the isolated metal atoms, and to rearrange these atoms into ultra-fine metal particles. In regard to the upper-limit temperature of this process, any temperature below the melting point of the bulk metal is permissible; it is desirable that this temperature be 80% of the melting point of the deposited metal or lower, preferably 70% of such a melting point or lower. Furthermore, the firing atmosphere may be an oxidizing atmosphere or a thin air atmosphere; this atmosphere may be appropriately selected in accordance with the final product.

furthermore, a major special feature of the present invention is that the above-described photocatalyst supporting ultra-fine metal particles, which has an extremely superior photocatalytic capacity, is supported on a base material. In cases where titanium dioxide alone is supported on a base material, the limits on the decomposing power of the titanium dioxide translate into limits on the self-cleansing decomposing power of the base material, so that there are limits on the quality of the base material as a commercial product. In the present invention, the quality of the above-described base material as a commercial product is greatly improved by causing a photocatalyst supporting ultra-fine metal particles to be held on said base material. The daily living environment is full of environmental contaminants and substances harmful to the human body; and merely by installing the base material of the present invention in such space, the self-cleansing decomposing function of the base material is caused to act so that the above-described organic substances are decomposed into water and carbon dioxide, thus insuring a cleansing of the environment. The decomposition of inorganic substances is more difficult than the decomposition of organic substances; however, the decomposition of organic substances eliminates the adhesion to the base material of inorganic substances such as dust, etc., which use organic substances as a binder, so that long-term cleansing of the base material can be achieved.

Base materials used in the present invention may be classified into one-dimensional base materials, two-dimensional base materials and three-dimensional base materials. Fibers are a typical example of one-dimensional base materials.

Fibers include natural fibers and chemical fibers. Chemical fibers include inorganic fibers, regenerated fibers, semi-synthetic fibers and synthetic fibers. Natural fibers include animal fibers, vegetable fibers and mineral fibers (asbestos, etc.). Inorganic fibers include metal fibers, glass fibers, carbon fibers and active carbon fibers, etc. Synthetic fibers include polyester, polyacrylic, polyamide, polypropylene, polyethylene, polyvinyl alcohol, polyvinyl chloride, polyvinylidene chloride, polyurethane, polyalkylparaoxybenzoate and polytetrafluoroethylene fibers, etc. Furthermore, super fibers of recent years, e.g. aramide fibers, all-aromatic polyester fibers and heterocyclic fibers, etc. are also included in the fibers used in the present invention.

The above-described photocatalyst supporting ultra-fine metal particles can be held on fibers of an adsorbing material. The term "fibers of an adsorbing material" refers to fibers which adsorb environmental contaminants, i.e., base materials produced by forming adsorbing materials into fibers, such as active carbon fibers, zeolite fibers, porous ceramic fibers, etc. Such materials may be produced by forming adsorbing materials into fibers, or by coating fiber-form materials with an adsorbing agent. In the following, active carbon fibers will be described as an example. In cases where fibers holding a photocatalyst supporting ultra-fine metal particles are combined with simple active carbon fibers by mix-spinning, an advantage that in addition to the above-described adsorbing and decomposing effect, the fibers have the same color so that the range of applications is expanded, can be obtained. Moreover, in cases where fine particles of a metal-supporting photocatalyst are formed on the surfaces of active carbon fibers, the fibers are superior in that such fibers used alone have an adsorbing and decomposing capacity.

Not only fibers, but also knitted fabrics formed by knitting such fibers, woven fabrics formed by weaving such fibers, and non-woven fabrics such as felts, etc. formed by molding such fibers into the form of non-woven fabrics, as well as filters, curtains, carpets and other fiber products, are also included among base materials which can be used in the present invention. Such filters can be utilized in air cleaners, water cleaners, toilet deodorizers, room deodorizers, refrigerator deodorizers, etc.

Examples of planar two-dimensional base materials which can be used in the present invention include window glass, mirrors, tables, wall materials, tiles, sliding door screens, coverlets, etc. Examples of solid three-dimensional base materials which can be used include toilets, furniture, ornamental items, etc. By providing the photocatalyst supporting ultra-fine metal particles of the present invention on the surfaces of such base materials, organic environmental contaminants, substances harmful to the human body and unpleasant odors, etc. can be naturally cleansed and decomposed by means of ultraviolet light from natural sunlight, fluorescent lamps or ultraviolet lamps. Since organic matter is decomposed, adhering inorganic contaminants using organic matter as a binder also become less likely to adhere.

Various methods can be used so as to hold the above-described photocatalyst supporting ultra-fine metal particles on the base material. For example, such methods include: an immersion method in which a powder consisting of a photocatalyst supporting ultra-fine metal particles is dispersed in an appropriate solvent, and the base material is immersed in this solvent, thus applying fine particles of the metal-supporting photocatalyst to the base material; a spray method in which a solvent containing a dispersed photocatalyst supporting ultra-fine metal particles is sprayed onto the base material, and a coating method that uses rollers or brushes in the case of two-dimensional base materials or three-dimensional base materials.

Furthermore, there are also methods in which the photocatalyst supporting ultra-fine metal particles is electrostatically adsorbed on the base material. The fine particles of a photocatalyst supporting ultra-fine metal particles and base material are charged with static electricity in a natural state; accordingly, a powder of the fine particles of a photocatalyst supporting ultra-fine metal particles can be sprayed onto the base material by means of the above-described electrostatic adsorbing force so that the photocatalyst is applied thereon, or the base material can be pushed into a powder of the photocatalyst so that the photocatalyst is likewise applied thereon. Furthermore, using the principle of electrical dust collection, it would also be possible first to forcibly charge the fine particles of a photocatalyst supporting ultra-fine metal particles by means of a corona discharge, and then to apply the particles to plates or outside the electrode plates by means of the electric field force generated between the electrode plates.

By heating the base material, to which the fine particles of a photocatalyst supporting ultra-fine metal particles have been applied by one of the above-described methods, to an appropriate temperature, it is possible to hold the photocatalyst particles firmly on the base material. In an even more effective method, the photocatalyst supporting ultra-fine metal particles can be firmly held on the base material by coating the surface of the base material beforehand with a binder which can be cured by heating, applying the photocatalyst supporting ultra-fine metal particles on top of said binder by means of one of the above-described methods, and then curing the binder by heating.

Furthermore, the above-described photocatalyst supporting ultra-fine metal particles can be held on the surfaces of carbon fibers or active carbon fibers by the following manner: the fine particles of a photocatalyst supporting ultra-fine metal particles are applied by one of the above-described methods to the surfaces of carbon fibers or active carbon fibers prepared beforehand as a base material, and then the fibers are fired at a prescribed temperature. As a result, the photocatalyst supporting ultra-fine metal particles can be firmly held on the carbon fibers or active carbon fibers.

Furthermore, it would also be possible to convert fiber raw materials into carbon fibers by means of a carbonization treatment or to further convert such fibers into active carbon fibers by one of the methods described above. Fiber raw materials are not limited to simple fibers alone and include fabrics such a knitted or woven fabrics, etc., and other molded fiber products.

Carbon fiber raw materials include rayon fibers, pitch fibers produced by melt-spinning petroleum pitch or coal pitch, acrylic fibers and many other types of fibers; and more or less the same firing method can be used in order to convert these fibers into carbon fibers or active carbon fibers. In particular, the main raw material for carbon fibers is PAN (polyacrylonitrile), and fibers obtained by spinning this polymer are acrylic fibers. As will be described below for acrylic fibers, such acrylic fibers are converted into carbon fibers when heated at a temperature of 1,000 to 1,800° C. in an inert atmosphere.

When such carbon fibers are subjected to an activation treatment in a mixed gas consisting of steam, carbon dioxide, nitrogen, etc., active carbon fibers in which countless micropores are formed can be produced; and the photocatalyst supporting ultra-fine metal particles as described above is held on such active carbon fibers. Because of the adsorbing power of these active carbon fibers and the decomposing power of the photocatalyst supporting ultra-fine metal particles, the self-cleansing decomposing capacity can be greatly improved.

Active carbon fibers that hold photocatalyst supporting ultra-fine metal particles can also be manufactured by means of a continuous treatment from ultra-fine metal particles, fine photocatalyst particles and a fiber raw material such as an acrylic material, etc. More specifically, by running the fiber raw material through a heating furnace and performing a carbonization treatment and an activation treatment, active carbon fibers can be manufactured. In a reaction column, a colloid of an organo-metallic complex and fine particles of a photocatalyst are sprayed toward each other, thus producing fine photocatalyst particles with an adhering colloid in space; and when the active carbon fibers are run through an intermediate point in the falling path of the fine particles, the fine photocatalyst particles with the adhering colloid are applied to the surfaces of the active carbon fibers. If these active carbon fibers are run through a heating furnace at approximately 500° C., active carbon fibers on which the above-described photocatalyst supporting ultra-fine metal particles is firmly held can be continuously manufactured.

BEST MODE FOR CARRYING OUT THE INVENTION

Embodiment 1

[Preparation of Two Types of Photocatalysts Supporting Ultra-Fine Pt Particles]

A hydrophobic colloid of balsam Pt, which is an organo-metallic complex, was dispersed in hydrophilic acetone, thus producing an organo-metallic complex colloid solution with a concentration of 2.5 wt %. Powdered titanium dioxide with a rutile type crystal structure and a mean particle diameter of 300 nm was mixed with the colloid solution as fine photocatalyst particles, so that the colloid was caused to adhere to the fine titanium dioxide particles. This colloid solution was applied to a Pyrex glass plate and dried and the was fired for 30 minutes at 500° C. The resulting product was peeled from the glass plate, thus producing a photocatalyst A supporting ultra-fine metal particles. Photocatalyst B supporting ultra-fine metal particles was similarly produced using powdered titanium dioxide with a rutile type crystal structure.

Figure 1:
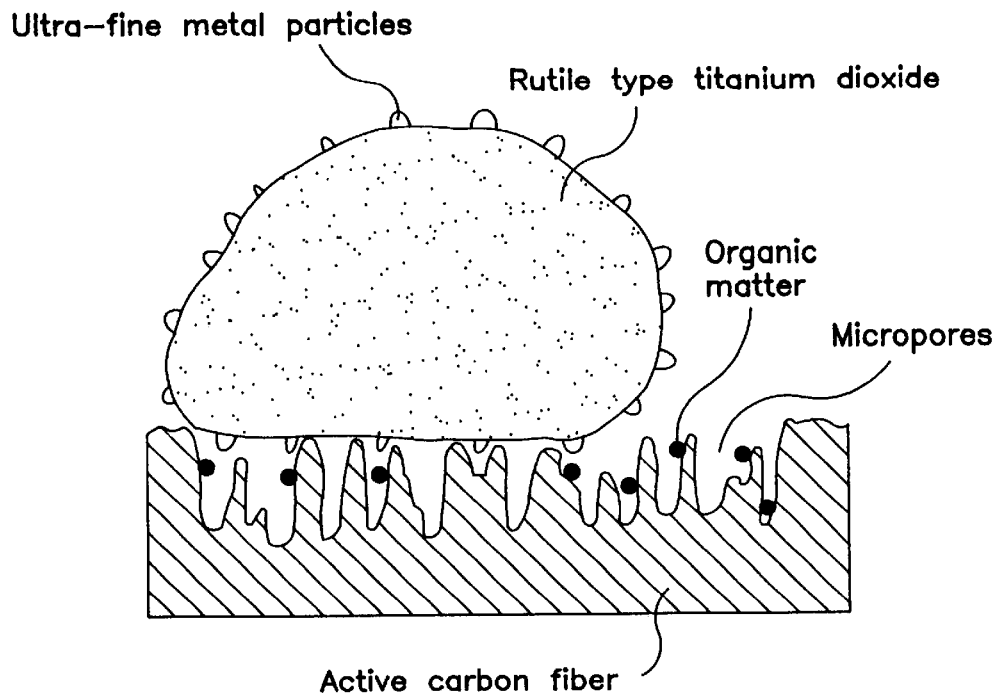
FIG. 1 is a model diagram illustrating a state in which a photocatalyst supporting ultra-fine metal particles is held on active carbon fibers.
Figure 2:
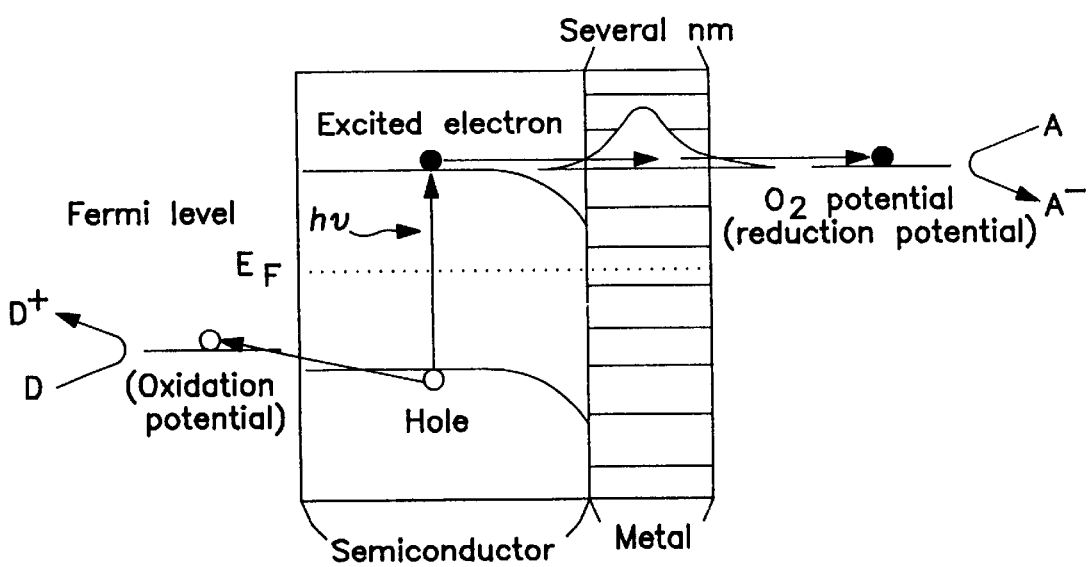
FIG. 2 is an explanatory diagram of the band structure, which illustrates the quantum size effect of the ultra-fine metal particles.
Figure 3:
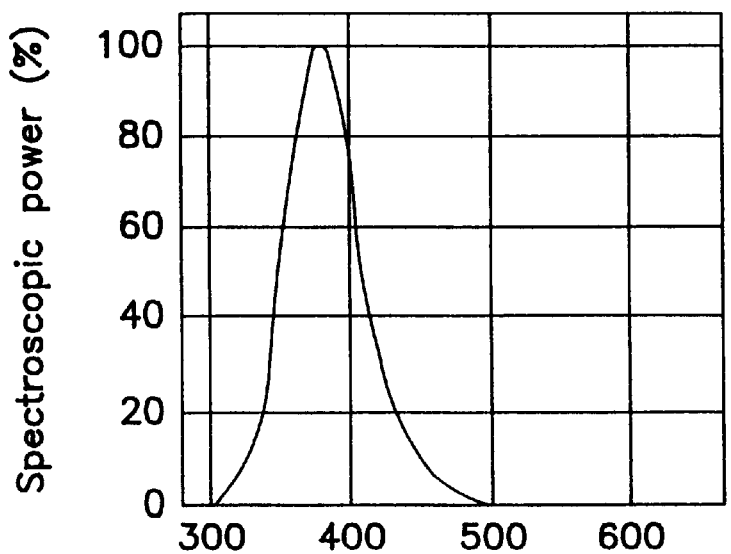
FIG. 3 is a wavelength distribution diagram of the ultra-violet light intensity of a moth-attracting lamp which can efficiently excite both rutile type and anatase type titanium dioxide.
Figure 4:
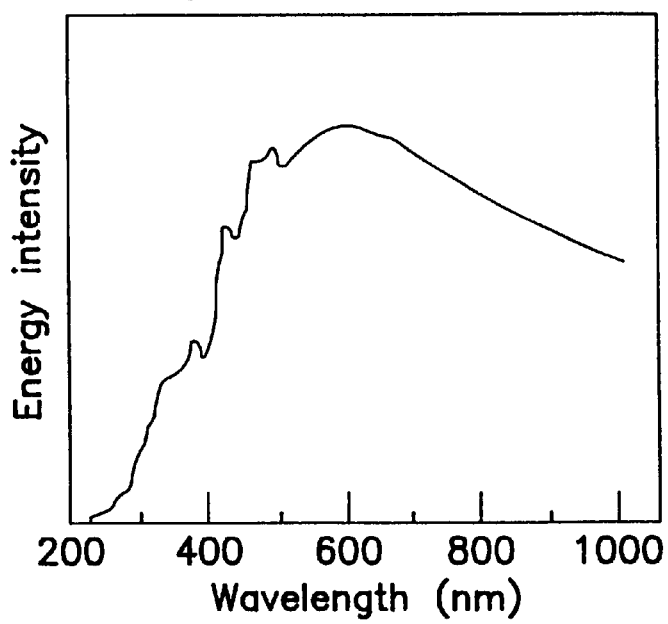
FIG. 4 is a wavelength distribution diagram of the intensity of natural sunlight.
Figure 5:
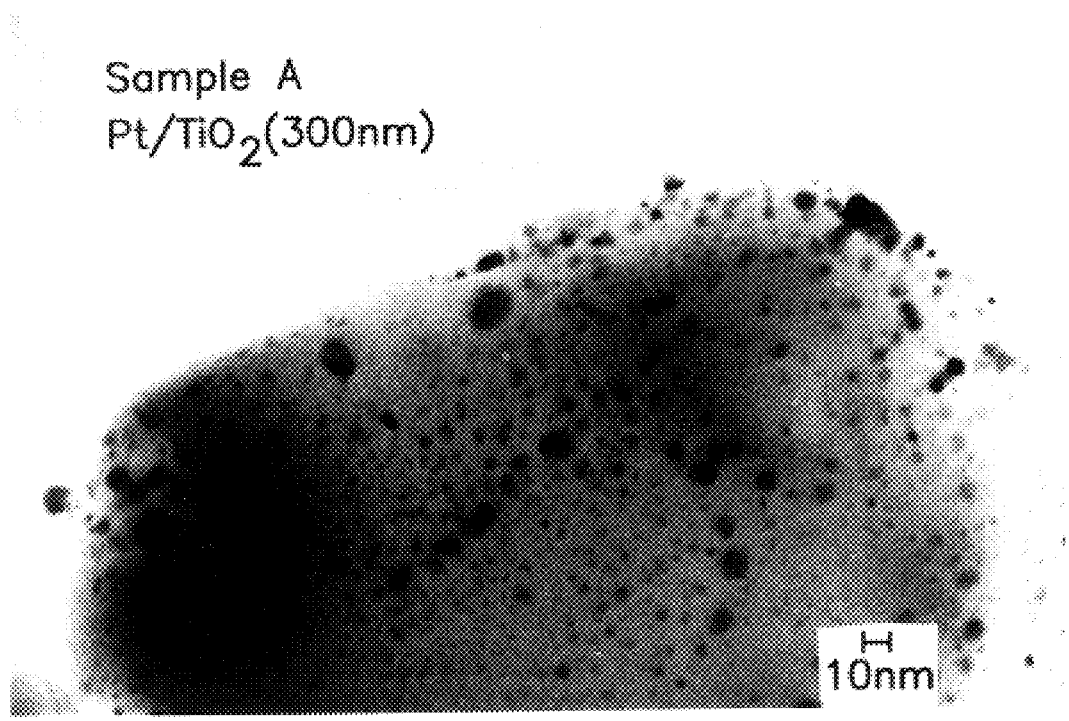
FIG. 5 is a transmission electron micrograph illustrating a state in which ultra-fine Pt particles are supported on titanium dioxide with a mean particle diameter of 300 nm.
Figure 6:
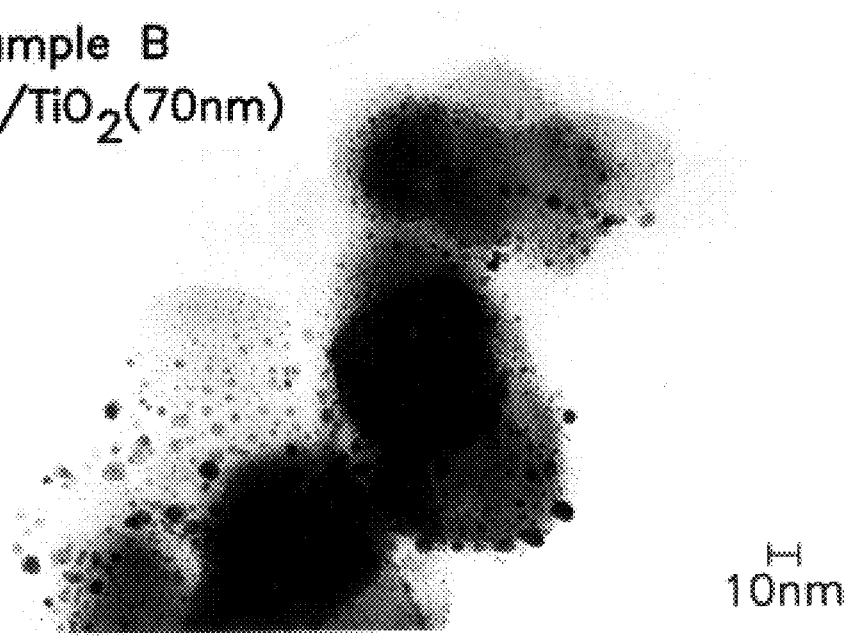
FIG. 6 is a transmission electron micrograph illustrating a state in which ultra-fine Pt particles are supported on titanium dioxide with a mean particle diameter of 70 nm.
Figure 7:
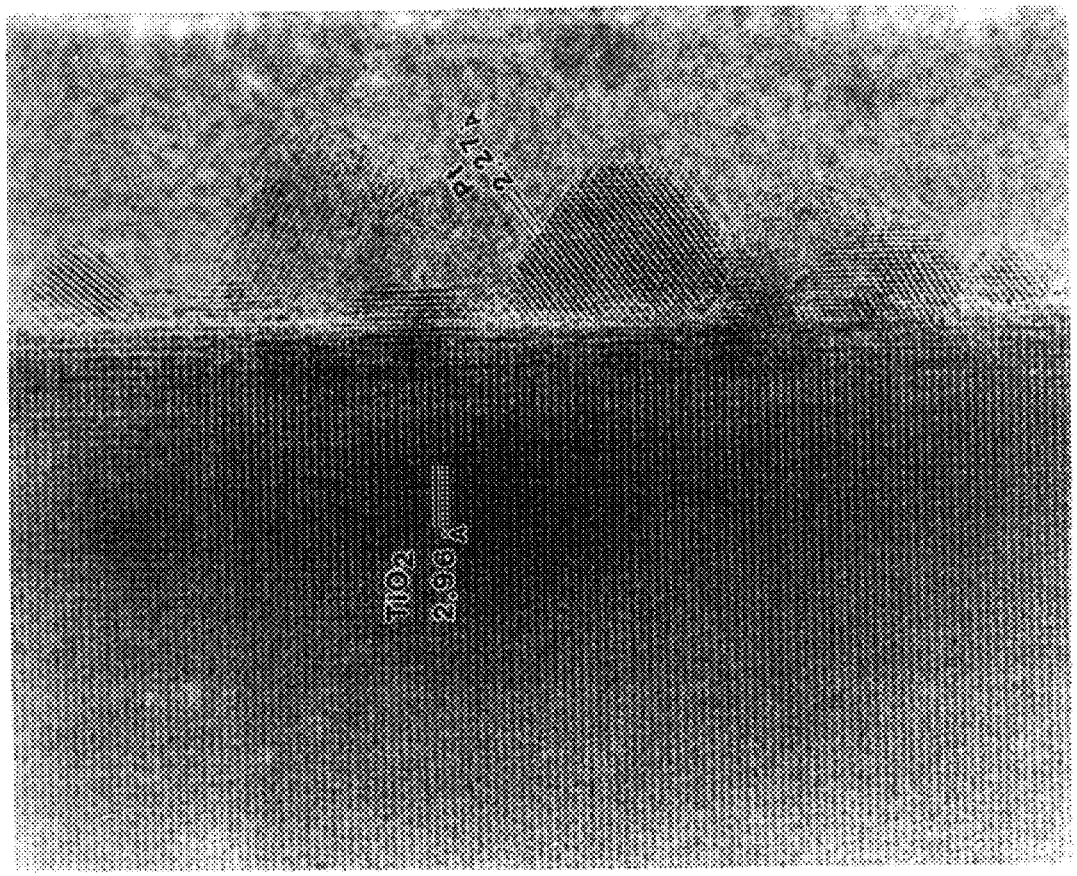
FIG. 7 is a lattice image of the state in FIG. 5 obtained by means of a high-resolution transmission electron microscope.
Figure 8:
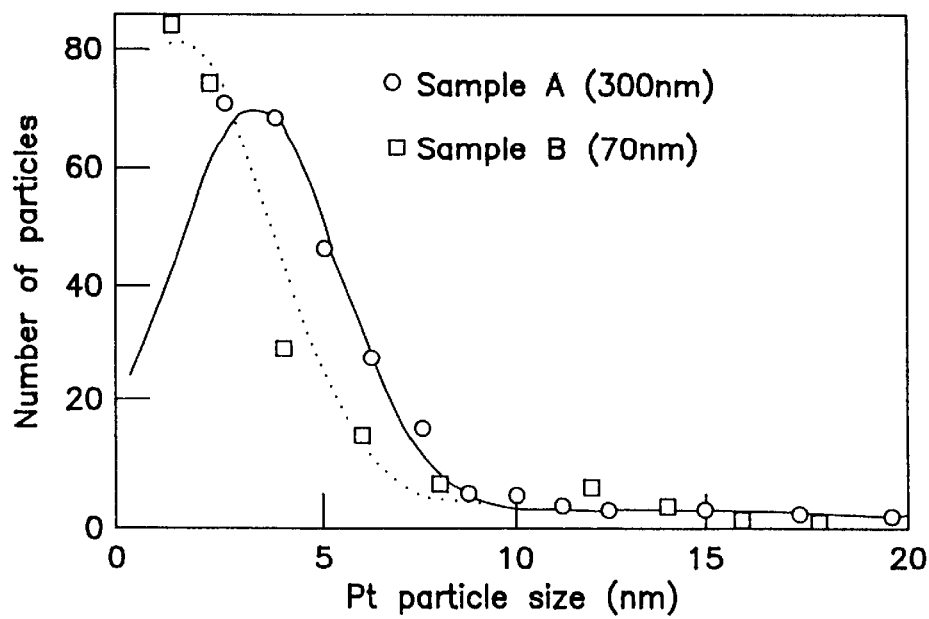
FIG. 8 is a diagram showing the particle size distributions of the ultra-fine Pt particles shown in FIGS. 5 and 6.

FIG. 5 is a transmission electron micrograph of A, and FIG. 6 is a transmission electron micrograph of B. These micrographs show the state in which the ultra-fine Pt particles are supported on the surfaces of the fine titanium dioxide particles. Furthermore, FIG. 7 shows a lattice image of A as observed by means of a high-resolution transmission electron microscope; and it is clearly seen from this lattice image that Pt is supported on rutile type titanium dioxide. FIG. 8 shows the particle size distributions of the ultra-fine Pt particles in A and B; and these results indicate that the mean particle diameter of A is 3 nm, and that the mean particle diameter of B is 1.5 nm. By using this colloid firing method, ultra-fine metal particles with a small mean particle diameter can be supported on titanium dioxide, thus causing the quantum size effect with constitutes the core of the present invention to be manifested most effectively.

Embodiment 2

[Measurement of Supporting Densities of Photocatalysts Supporting Ultra-Fine Pt Particles Obtained in Embodiment 1]

The supporting densities of ultra-fine Pt particles in Samples A and B obtained in Practical Example 1 were measured. In this case, the fine titanium dioxide particles and ultra-fine Pt particles were approximated by spherical shapes. Judging from the electron micrograph of A of FIG. 5, approximately 120 ultra-fine Pt particles were present on the surface of one fine titanium dioxide particle with a particle diameter of 200 nm, and the supported particle density per $cm^2$ was $2 \times 10^{11}$ particles. Likewise, judging from the electron micrograph of B of FIG. 6, approximately 300 ultra-fine Pt particles were present on the surface of one titanium dioxide particle with a particle diameter of 50 nm, and the supported particle density was $4 \times 10^{12}$ particles/$cm^2$. The supported particle density of ultra-fine metal particles is more easily grasped in direct sensory terms when expressed as the number of particles per titanium dioxide particle than when expressed as the number of particles per $cm^2$. It was ascertained form the measurement of numerous supported particle density values for fine titanium dioxide particles that the photocatalytic efficiency that is the object of the present invention can be obtained if the supported particle density is 100 particles or greater on the average.

Embodiment 3

[Comparison of Photocatalytic Efficiencies of Six Types of Photocatalysts Supporting Ultra-Fine Metal Particles]

Using Pt butylmercaptan instead of balsam Pt, six types of photocatalysts supporting ultra-fine metal particles were manufactured by supporting ultra-fine metal particles on titanium dioxide with a mean particle diameter of 300 nm using the same method as in Embodiment 1. In concrete terms, the six types of photocatalysts manufactured were rutile type, anatase type, rutile-Pt type, rutile-Au type, anatase-Au type and anatase-Pd type photocatalysts. The rutile and anatase type photocatalysts consisted of titanium dioxide alone with no supported metal. These photocatalyst powders will be referred to as C, D, E, F, G and H in the order described.

TABLE 1

Decomposing Power of Photocatalysts Supporting Ultra-Fine Metal particles.

| Symbol | Test sample | Acetaldehyde (%) | Acetic acid (%) | Total (%) |
| --- | --- | --- | --- | --- |
| C | Rutile type | 0.20 | 0.85 | 1.05 |
| D | Anatase type | 0.74 | 1310 | 1.84 |
| E | Rutile-Pt type | 0.90 | 4.38 | 5.28 |
| F | Rutile-Au type | 2.70 | 5.80 | 8.50 |
| G | Anatase-Au type | 1.00 | 8.50 | 9.50 |
| H | Anatase-Pd type | 0.90 | 6.70 | 7.60 |

These photocatalyst powders C through H were placed in tightly closed vessels, and ethanol was sealed inside these vessels. The respective amounts of acetaldehyde and acetic acid produced following one hour of exposure to an ultraviolet lamp were measured. The results obtained are shown in Table 1. Since ethanol is decomposed into acetaldehyde and then into acetic acid, the total amounts of acetaldehyde and acetic acid produced is an indicator of the decomposing power. Since the anatase sample D showed a value that was approximately 1.8 times that shown by the rutile sample C, it was demonstrated that anatase type titanium dioxide is effective when used alone. The values shown by E, F, G and H were approximately 5 times, approximately 8 times, approximately 9 times and approximately 7 times that shown by C, respectively. Furthermore, it can be seen that the decomposing power is high, i.e. approximately 3 times, approximately 4 times, approximately 5 times and approximately 4 times the value shown by D, respectively. Thus, it was found that photocatalyst supporting ultra-fine metal particles have a markedly superior decomposing power.

Embodiment 4
[Apparatus for the Continuously Manufacturing Fine Photocatalyst Particles Supporting Ultra-Fine Metal Particles]

Figure 9:
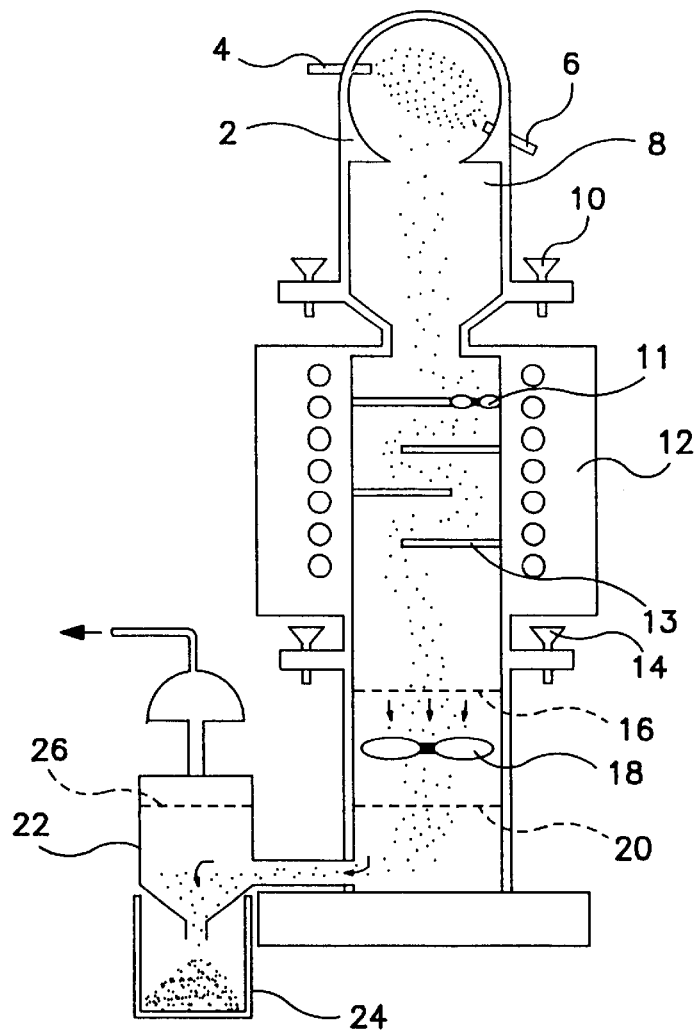
FIG. 9 is a schematic sectional view of an apparatus for the continuous manufacture of fine photocatalyst particles supporting ultra-fine metal particles.

FIG. 9 shows a schematic sectional view of an apparatus for continuously manufacturing fine photocatalyst particles supporting ultra-fine metal particles. A spraying device 4 which sprays an organo-metallic complex colloid solution and a fine-particle spray nozzle 6 which sprays fine photocatalyst particles are installed in a spray section 2 located at the top of the apparatus. For example, if the fine particles of titanium dioxide and Pt butylmercaptan colloid solution are sprayed toward each other, numerous colloid particles will adhere to the fine particles of titanium dioxide. These particles with the adhering colloid then drop under their own weight into a first heat tank 8, where the particles are dried at approximately 100° C. From the point below the first flange part 10 is a second heating tank 12, and the fine particles with adhering colloid are forcibly caused to pass between baffle plates 13 by a feeding fan 11 of this second heating tank 12 and are heated to approximately 500° C. As a result of this heating, the organic substance in the complex is completely decomposed, so that the metal atoms aggregate and are rearranged into ultra-fine metal particles. Porous buffer plates 16 and 20 are installed beneath the second flange part 14, and a fan 18 is installed between these buffer plates. As a result of the attractive force of the fan 18, the fine photocatalyst particles supporting the ultra-fine metal particles pass through the porous buffer plates 16 and 20; and fine photocatalyst particles which have bonded together to form large clumps are blocked here; thus, the size of the fine particles is adjusted. Fine photocatalyst particles continuously accumulate in a vessel 24 via a buffer 22. The air current is exhausted by suction evacuation to the outside via a porous buffer plate 26 that blocks the photocatalyst particles.

Embodiment 5
[Comparison of Fine Photocatalyst Particles Supporting Pt and Conventional Fine Photocatalyst Particles Obtained by the Continuous Manufacturing Apparatus]

U-f Pt particles with a mean particle diameter of 1.5 nm were supported on rutile type titanium dioxide with a mean particle diameter of 70 nm using the continuously manufacturing apparatus described in Embodiment 4, thus producing a photocatalyst supporting ultra-fine metal particles. The supported particle density of the ultra-fine Pt particles was 600 particles per fine particle of titanium dioxide. The photocatalytic efficiency of this photocatalyst supporting ultra-fine Pt particles (rutile-Pt) was compared with the valued obtained for anatase type titanium dioxide (alone) with a mean particle diameter of 70 nm and rutile type titanium dioxide (alone with a mean particle diameter of 70 nm. Two types of atmospheres, i.e., oxygen and argon gas, were prepared as reaction atmospheres; and the effect of super-oxide anions was also checked. Rutile-Pt/$O_2$ was designated as I, anatase/$O_2$ was designated as J, anatase/Ar was designated as K, and rutile/$O_2$ was designated as L.

Figure 10:
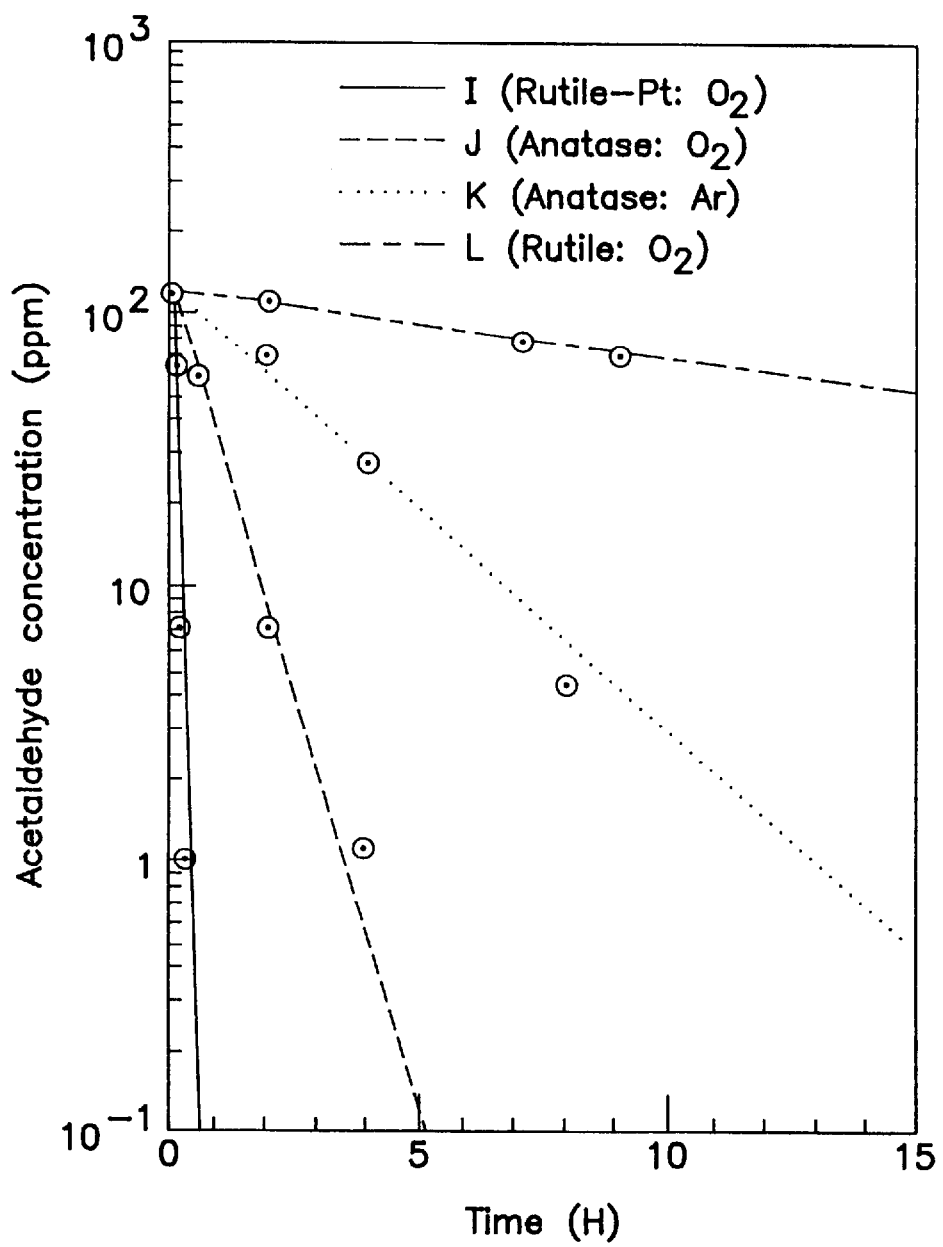
FIG. 10 is a diagram showing the progression over time of acetaldehyde decomposition by means of titanium dioxide supporting Pt, and titanium dioxide alone.
Figure 21:
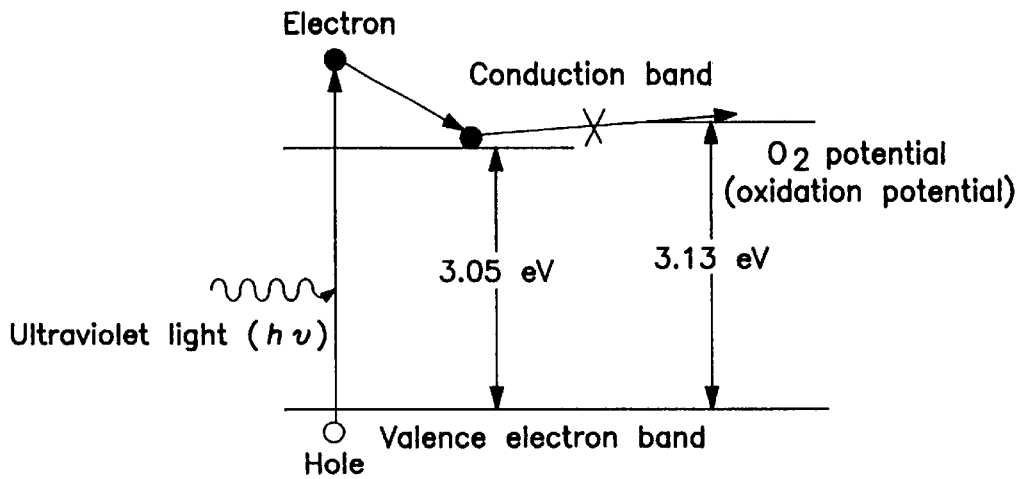
FIG. 21 is a schematic diagram of a band structure which illustrates why it is difficult for rutile type titanium dioxide to reduce oxygen.
Figure 22:
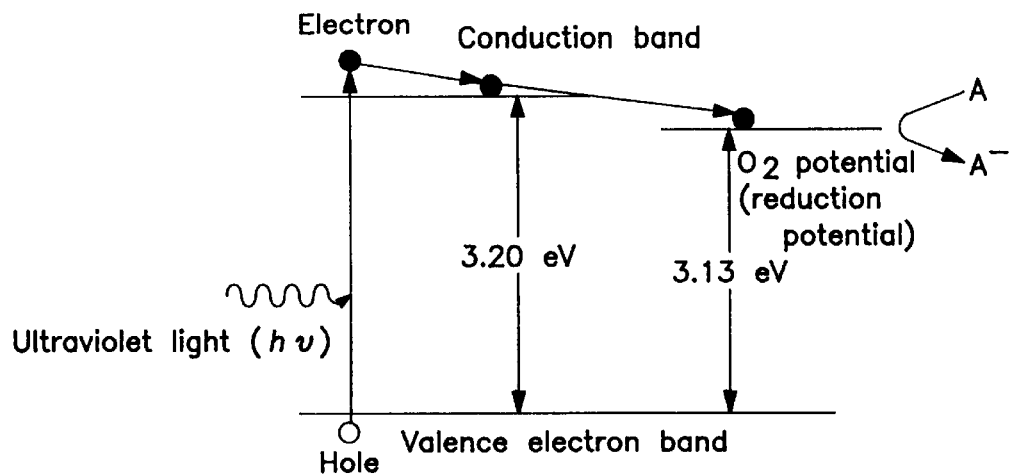
FIG. 22 is a schematic diagram of a band structure which shown why anatase type titanium dioxide can easily reduce oxygen.

In all four types of systems, the amount of catalyst used was 0.5 g; and in order to ascertain the efficiency of decomposition of acetaldehyde into acetic acid, measurement was initiated from an acetaldehyde concentration of 100 ppm inside a tightly closed vessel and was continued until a concentration of 1 ppm was reached. The results are shown in a semi-log graph in FIG. 10. It is seen from a comparison of I and J at the same instants in time following the initiation of measurement that a catalyst supporting Pt shows a catalytic efficiency that is approximately 10 times greater than that of anatase alone, and that this is a very high value even compared to Embodiment 3. The reasons for this are that the supported particle density of the metal is fairly high and the particle diameter of the ultra-fine Pt particles is uniform and fairly small. Furthermore, a comparison of J and K demonstrates that decomposition is not promoted by argon gas and the presence of oxygen is effective. In other words, the presence of super-oxide anions acts effectively in the oxidation-reduction process. Moreover, the catalytic efficiency was the poorest in the case of rutile type titanium dioxide used alone even in the presence of oxygen, thus demonstrating the facts illustrated in FIGS. 21 and 22.

Embodiment 6
[Acrylic Fibers Holding a Photocatalyst Supporting Ultra-Fine Pt Particles]

Figure 11:
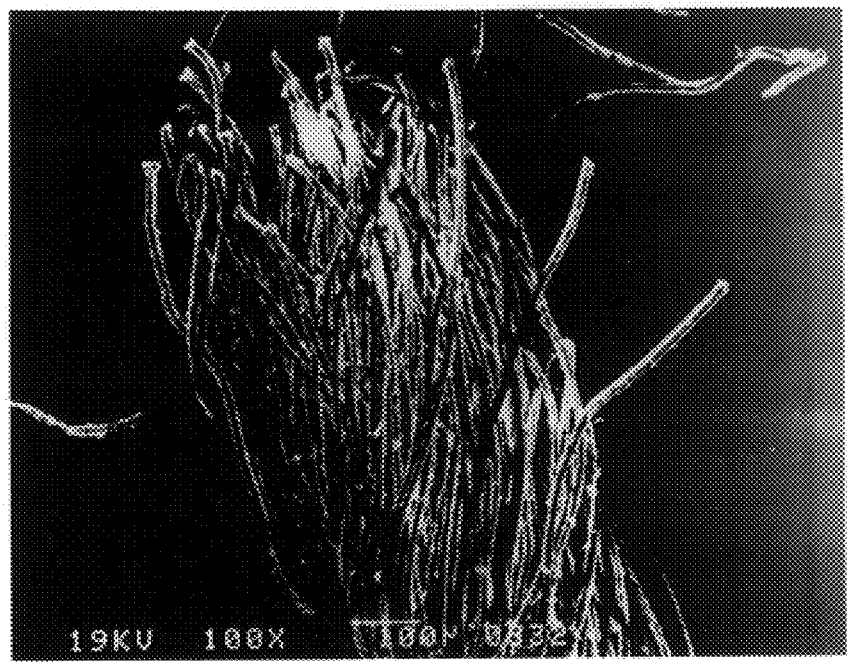
FIG. 11 is an electron micrograph showing the electrostatic adsorption on acrylic fibers of a powdered photocatalyst supporting ultra-fine metal particles.
Figure 12:
FIG. 12 is an electron micrograph showing a further enlargement of FIG. 11.

Sample B prepared in Embodiment 1, i.e., a powder consisting of a rutile-Pt type photocatalyst supporting ultra-fine metal particles with a mean titanium dioxide particle diameter of 70 nm, was sprayed onto acrylic fibers and held in place by the electrostatic force of both materials. The excess powder was removed by lightly striking the acrylic fibers. FIG. 11 is an electron micrograph showing how the photocatalyst supporting ultra-fine metal particles was held on the acrylic fibers by static electricity, and FIG. 12 is a further enlarged electron micrograph of the same. It can be seen that the photocatalyst supporting ultra-fine metal particles is held in place over the entire surface of each fiber. The weight of the photocatalyst supporting ultra-fine metal particles thus held on the fibers was 3% of the weight of the acrylic fibers. The photocatalyst has an effect as long as this weight is 1% or greater; and in cases where accelerated experiments are performed, this weight may be set at 5% or 10% in some instances.

Embodiment 7
[Apparatus for Continuously Manufacturing Active Carbon Fibers Holding Photocatalyst Supporting Ultra-Fine Metal Particles]

Figure 13:
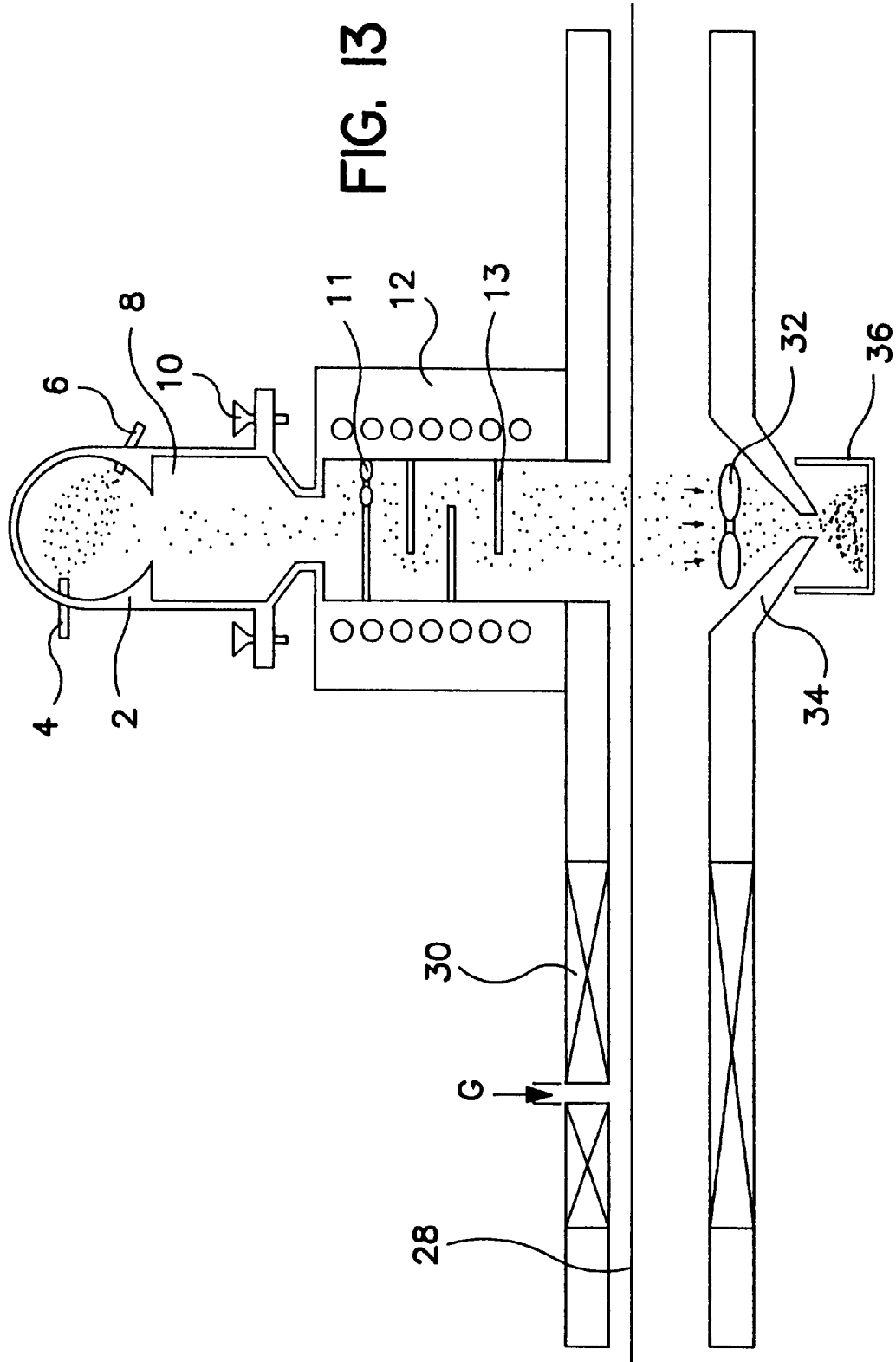
FIG. 13 is a schematic sectional view of an apparatus for the continuous manufacture of active carbon fibers holding a photocatalyst supporting ultra-fine metal particles.

FIG. 13 shows an apparatus which continuously causes a photocatalyst supporting ultra-fine metal particles to be held on active carbon fibers while such active carbon fibers are manufactured. Elements which are the same as in FIG. 9 are labeled with the same reference numerals. The reaction column is constructed from a spray part 2, a first heating tank 8 and a second heating tank 12; and the first heating tank 8 is connected to the second heating tank 12 by first flange part 10. A colloid solution of an organo-metallic complex is sprayed from a spraying mechanism 4, and fine particles of a photocatalyst are sprayed from a fine-particle nozzle 6, so that the two substances are sprayed toward each other. As a result of collisions between particles, numerous particles of the organo-metallic complex colloid adhere to the surfaces of the fine photocatalyst particles, and the resulting particles drop downward under their own weight. First, the particles are heated to approximately 100° C. in the first heating tank 8, so that the water content is evaporated. Next, the particles are fed by the feeding fan 11 into the second heating tank which is maintained at 500° C., so that the metal is reduced from the colloid and is gradually grown into ultra-fine metal particles while the photocatalyst particles pass between the baffle plates 13.

Meanwhile, a fiber raw material 28 consisting of acrylic fibers, etc. or a formed fiber product (fabric, etc.) of the same is caused to run while being subject to carbonization treatment at 1000° C. or higher and is subsequently subjected to an activation treatment by means of an activating gas G and a heater 30, so that the fiber raw material is finished into active carbon fibers. In this stage, the fibers are caused to run beneath the reaction column, so that the photocatalyst supporting ultra-fine metal particles which falls from above is applied to the surfaces of the active carbon fibers. While being heated at approximately 500° C., the photocatalyst supporting ultra-fine metal particles which is not applied to the active carbon fibers is drawn by the fan 32 and stored in a vessel 36 via a hopper 34.

Embodiment 8
[Adsorbing and Decomposing Effects of Active Carbon Fibers and Photocatalysts]

Figure 14:
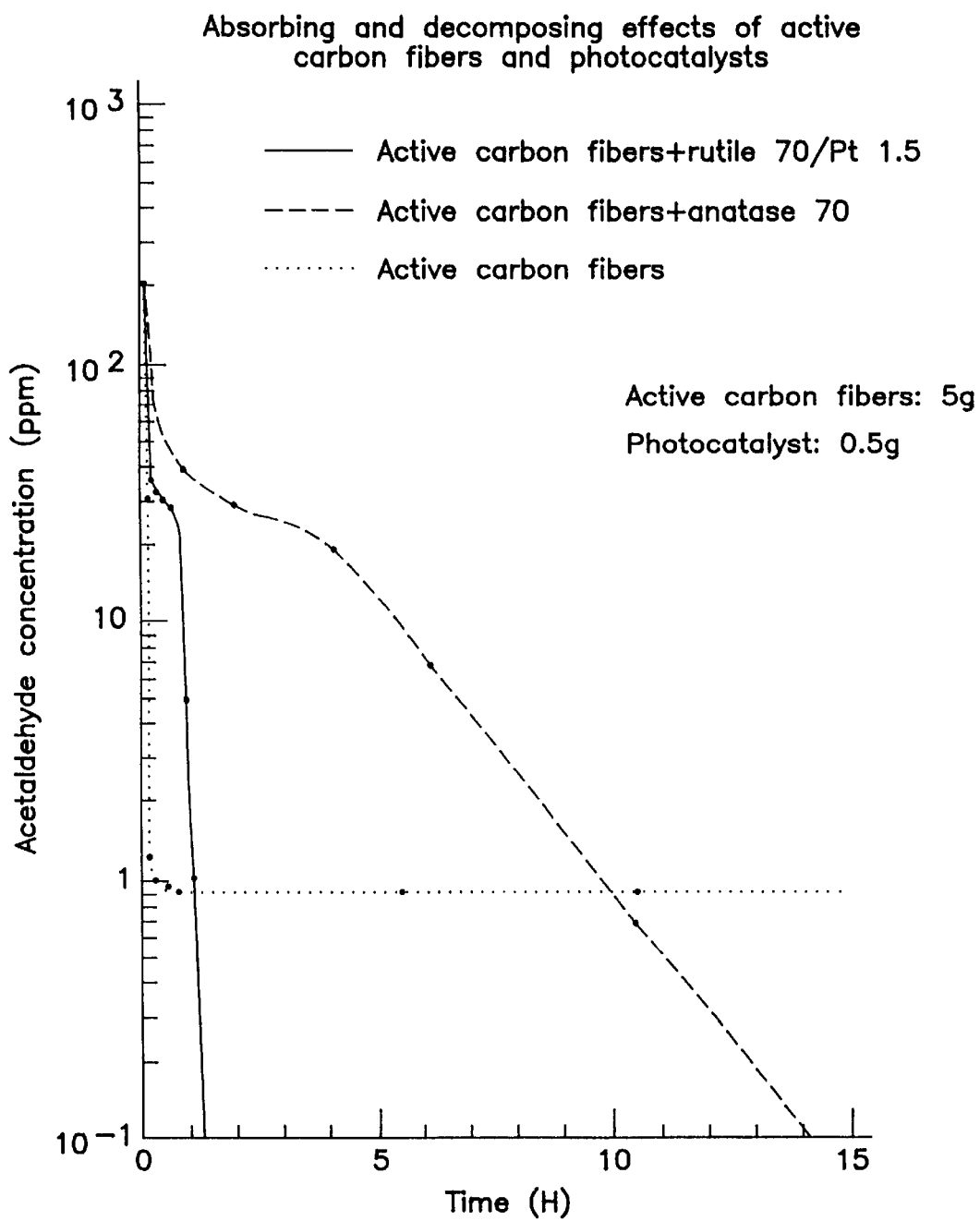
FIG. 14 is a diagram showing the trend of an acetaldehyde concentration over time, which illustrates the adsorbing and decomposing effects of active carbon fibers and photocatalysts.

Three types of samples were compared: a sample in which the rutile 70/Pt 1.5 photocatalyst supporting ultra-fine metal particles was held on active carbon fibers, a sample in which only anatase type titanium dioxide with a mean particle diameter of 70 nm was held on active carbon fibers, and a sample consisting of active carbon fibers alone. The results obtained are shown in FIG. 14. A photocatalyst of 0.5 g was supported on 5 g of active carbon fibers. First, starting from an initial acetaldehyde concentration of 200 ppm, changes in this concentration overtime were measured. The active carbon fibers reached an adsorption equilibrium after adsorption down to a concentration of 1 ppm, and the concentration did not drop any further than this. In the case of the sample of rutile 70/Pt 1.5, the concentration dropped abruptly; and it can be seen that this sample showed an adsorbing and decomposing power that was 10 to 100 times greater than even that of the anatase 70 sample. Particularly in the case of the sample of rutile 70/Pt 1.5, the concentration drops almost vertically in the low-concentration region, thus indicating a large decomposing power.

Embodiment 9
[Repetitive Effects of Active Carbon Fibers and Rutile 70/Pt 1.5]

Figure 15:
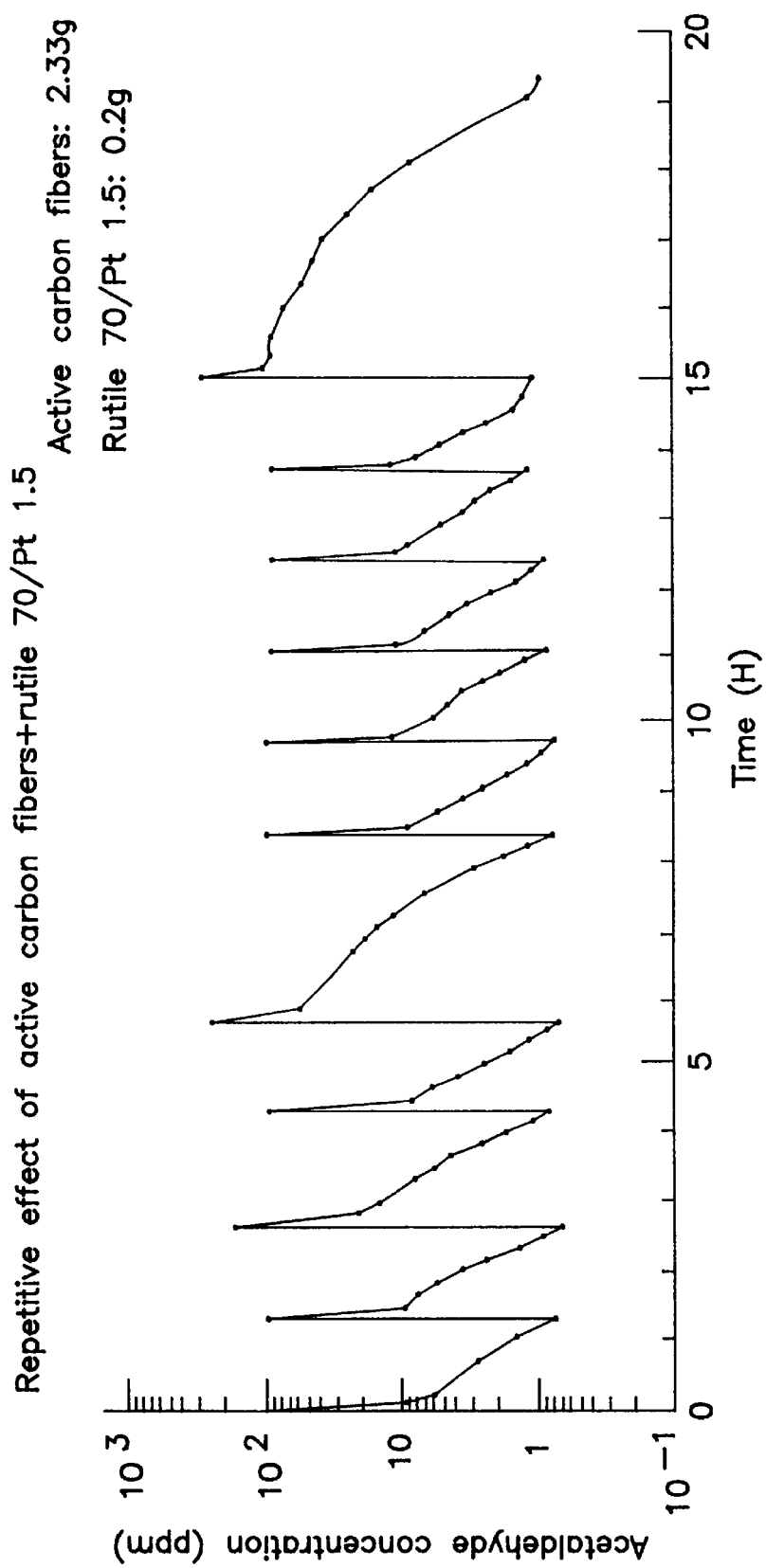
FIG. 15 is a diagram of the repetitive effect on the acetaldehyde concentration in a case where rutile 70/Pt 1.5 photocatalyst supporting ultra-fine metal particles is held on active carbon fibers.

FIG. 15 shows the repetitive effects of active carbon fibers and a rutile 70/Pt 1.5 sample. In this test, measurement was begun at an acetaldehyde concentration of 100 ppm; and whenever this concentration dropped to 1 ppm, acetaldehyde was injected from the outside so that the concentration was again returned to 100 ppm. The adsorbing power of the active carbon fibers and the decomposing effect of the photocatalyst were investigated by means of this repetitive operation. The repetitive effect of 11 cycles was examined; however, the period required for a drop from 100 ppm to 1 ppm remained at 80 minutes, and showed almost now change. The period is longer in the fifth and eleventh cycles, and the reason for this is that the acetaldehyde was injected in excess to a concentration of 300 to 400 ppm in these cycles. The fact that there is no deterioration indicates that the acetaldehyde is adsorbed on the active carbon fibers, and that almost all of the adsorbed acetaldehyde is at the same time decomposed by the photocatalyst. In other words, active carbon fibers holding a photocatalyst supporting ultra-fine metal particles have an extremely effective adsorbing and decomposing power.

Comparative Example 1
[Repetitive Effect of Active Carbon Fibers Alone]

Figure 16:
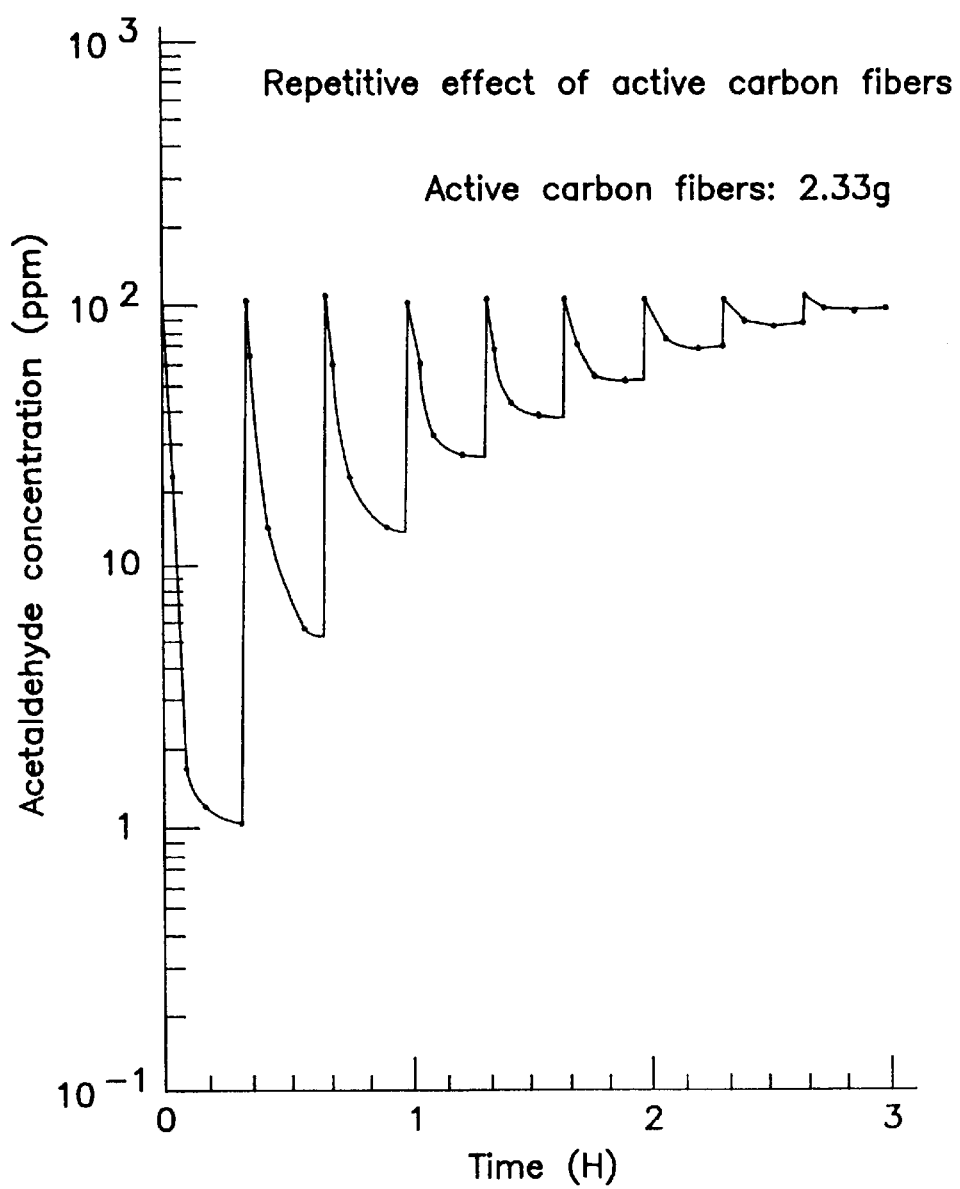
FIG. 16 is a diagram of the repetitive effect of active carbon fibers alone on the acetaldehyde concentration.

The repetitive effect of active carbon fibers alone was investigated as a comparative example. The results obtained are shown in FIG. 16. It can be seen that the period required for the concentration to drop and reach a saturation value is approximately 20 minutes, but the saturation value gradually increases so that there is almost no drop in the concentration in the ninth cycle. This indicates that when the micropores become filled with acetaldehyde, the adsorbing power of the active carbon fibers is lost.

Comparative Example 2
[Repetitive Effect of Active Carbon Fibers and Anatase 70]

Figure 17:
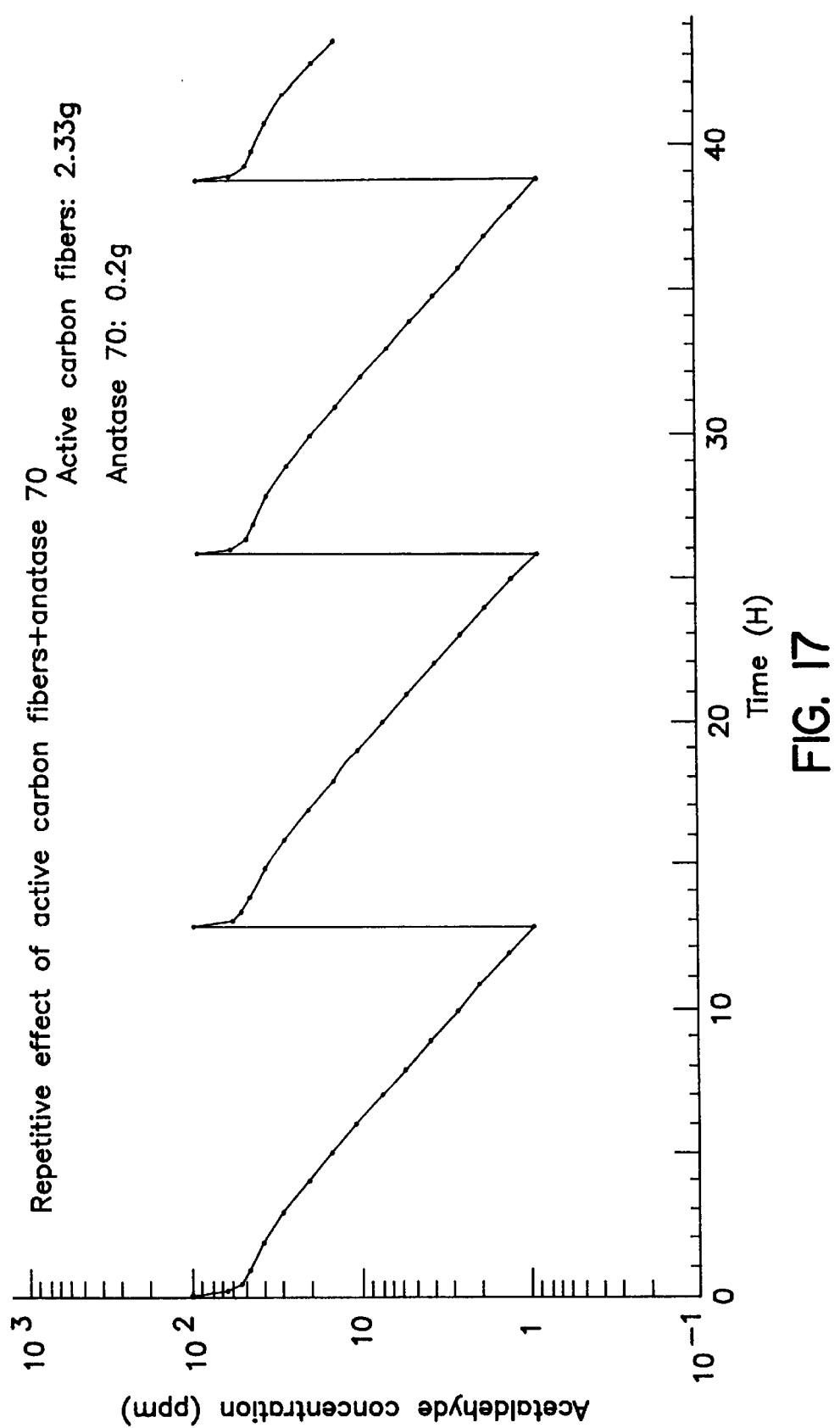
FIG. 17 is a diagram of the repetitive effect on the acetaldehyde concentration in a case where an anatase 70 photocatalyst is held on active carbon fibers.
Figure 18:
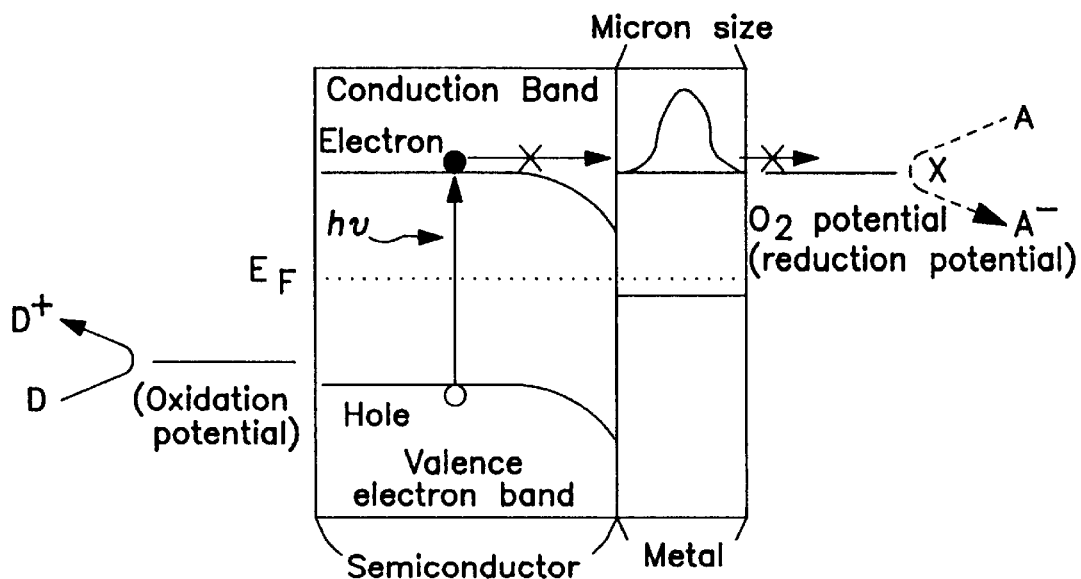
FIG. 18 is an explanatory diagram which shown the band structure of a conventional metal-supporting photocatalyst.
Figure 19:
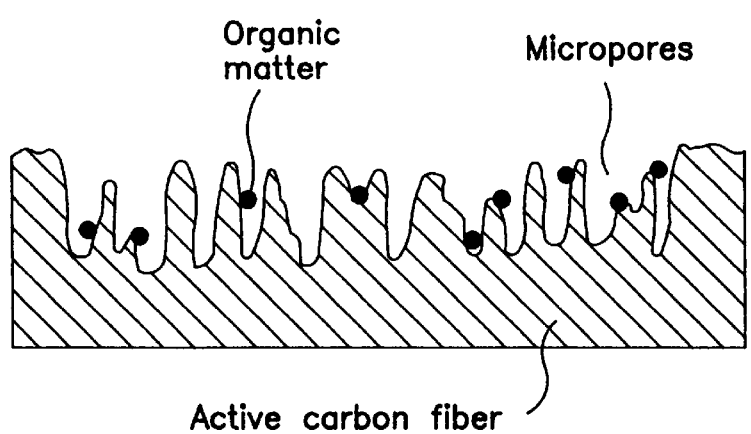
FIG. 19 is a model diagram showing adsorption state on the active carbon fibers.
Figure 20:
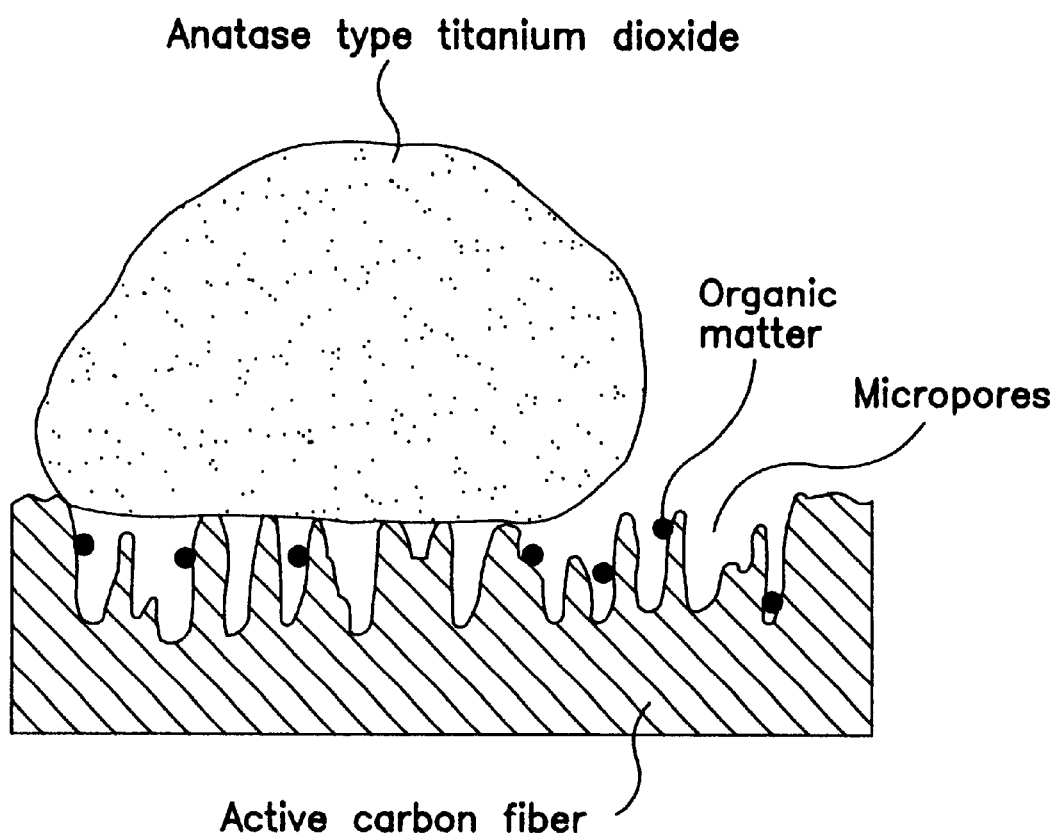
FIG. 20 is a model diagram illustrating a state in which anatase type titanium dioxide is held on active carbon fibers.

The repetitive effect in a case where conventional anatase type titanium dioxide with a mean particle diameter of 70 nm (anatase 70) was held on active carbon fibers was investigated. The results obtained are shown in FIG. 17. The method used was exactly the same as that used in Embodiment 9. Since the period was extremely long, i.e., 13 hours, the experiment could only be performed for three cycles. Thus, the period was approximately 10 times longer than the 80-minute period shown by the rutile 70/Pt 1.5 sample. This is too long for the cleansing of a human living environment.

It can be immediately understood how superior the results of Embodiment 9 of the present invention are to the results obtained in Comparative Examples 1 and 2.

Embodiment 10
[Thin Film-Form Spreading Substance Holding a Photocatalyst Supporting Ultra-Fine Metal Particles]

Fine particles of a photocatalyst on which ultra-fine metal particles were supported were mixed with a liquid plastic. This liquid plastic was spread on the surface of water to form a solid thin film-form plastic. A photocatalyst supporting ultra-fine metal particles was appropriately dispersed in this thin film-form plastic, and the plastic was exposed to air. This thin film-form plastic was held on the surfaces of planar two-dimensional or solid three-dimensional base materials. For example, wallpaper is a two-dimensional base material, and furniture is a three-dimensional base material.

The present invention is not limited to the embodiments described above, and various modifications and design alterations within a range which involves no departure from the technical spirit of the present invention are also included in the technical scope of the present invention.

INDUSTRIAL APPLICABILITY

The present invention is constructed from a photocatalyst supporting ultra-fine metal particles and a highly functional base material which holds this photocatalyst. The photocatalytic characteristics of photocatalyst supporting ultra-fine metal particles , i.e., the characteristics of such catalysts in terms of organic matter decomposing power, are far superior to those of photocatalysts supporting micron-sized metal particles or simple photocatalysts supporting no metal particles. Accordingly, an industry that manufactures photocatalyst supporting ultra-fine metal particles may be newly created. Furthermore, by causing such photocatalyst supporting ultra-fine metal particles to be held on various types of base materials, it is possible to achieve a strong self-cleansing decomposition of environmental contaminants, substances harmful to the human body, and unpleasant odors, etc., so that superior environmental hygiene can be accomplished. Since not only ultraviolet light sources but also natural sunlight may be used as a light source, such materials may be used in a wide range of home and office applications as environmental maintenance devices which do not require an external power source and are able to withstand long-term use. Consequently, new commercial products may be developed from the standpoint of photolytic function in the conventional environmental hygiene industry. In particular, an extremely superior adsorbing and decomposing effect is obtained in cases where photocatalysts supporting ultra-fine metal particles are held on active carbon fibers, and such products show great promise for future improvements of the living environment.

What is claimed is:

1. A method for manufacturing a highly functional base material holding a photocatalyst supporting ultra-fine metal particles characterized in that said method comprises: a first step in which a colloid of an organo-metallic compound is caused to adhere to rutile type titanium oxide fine particles, a second step in which said rutile type titanium oxide fine particles to which said colloid is adhered are applied to a base material, and a third step in which said base material is fired so that said organo-metallic compound is reduced, thus causing the ultra-fine metal particles to be firmly supported on said rutile type titanium oxide fine particles, and at the same time causing said rutile type titanium oxide fine particles to be firmly held on said base material.

2. A method for manufacturing a highly functional base material holding a photocatalyst supporting ultra-fine metal particles characterized in that said method comprises: a first step in which a colloid of an organo-metallic compound is caused to adhere to rutile type titanium oxide fine particles, a second step in which said rutile type titanium oxide fine particles to which said colloid is adhered are fired so that ultra-fine metal particles are firmly supported on said rutile type titanium oxide fine particles, and a third step in which said rutile type titanium oxide fine particles supporting said ultra-fine metal particles are applied to a base material and fired so that said rutile type titanium oxide fine particles are firmly held on said base material.

3. A method for manufacturing highly functional base material according to any one of claims 1 and 2, wherein a fiber raw material is modified into active carbon fibers by a carbonization treatment and an activation treatment, and resulting active carbon fibers are used as base material.

* * * * *